United States Patent
Shinohara

(10) Patent No.: US 11,418,669 B2
(45) Date of Patent: Aug. 16, 2022

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Taku Shinohara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/334,372

(22) Filed: May 28, 2021

(65) Prior Publication Data

US 2021/0409565 A1 Dec. 30, 2021

(30) Foreign Application Priority Data

Jun. 25, 2020 (JP) .............................. JP2020-109842

(51) Int. Cl.
*H04N 1/40* (2006.01)
*H04N 1/00* (2006.01)
*B65H 5/06* (2006.01)
*B65H 7/06* (2006.01)

(52) U.S. Cl.
CPC ......... *H04N 1/00809* (2013.01); *B65H 5/062* (2013.01); *B65H 7/06* (2013.01); *H04N 1/00708* (2013.01); *H04N 1/00779* (2013.01); *H04N 1/00785* (2013.01); *H04N 1/00814* (2013.01); *B65H 2220/09* (2013.01)

(58) Field of Classification Search
None
See application file for complete search history.

(56) References Cited

U.S. PATENT DOCUMENTS

| | | | | |
|---|---|---|---|---|
| 2010/0053696 A1* | 3/2010 | Sasano | ...................... | H04N 1/40 358/449 |
| 2013/0135644 A1* | 5/2013 | Sato | ................... | H04N 1/00474 358/1.13 |
| 2014/0089840 A1* | 3/2014 | Nakagawa | .......... | G06F 3/04847 715/810 |
| 2015/0156359 A1* | 6/2015 | Hayakawa | ......... | H04N 1/00809 358/474 |

(Continued)

FOREIGN PATENT DOCUMENTS

JP H09297434 A 11/1997

*Primary Examiner* — Dung D Tran
(74) *Attorney, Agent, or Firm* — Canon U.S.A., Inc. I.P. Division

(57) ABSTRACT

An image processing apparatus includes a selection unit, a determination unit, and a control unit to set candidates to be selected by the selection unit. If determination unit determines that there is not a set of a size and an orientation of a document of which the orientation cannot be correctly determined, the control unit sets, as selection unit selection candidates, candidates of sets of sizes and orientations of a plurality of documents. If the determination unit determines that there is a set of a size and an orientation of a document of which the orientation cannot be correctly determined, the control unit sets, as selection unit selection candidates, candidates obtained by excluding the set of the size and the orientation of the document of which the orientation cannot be correctly determined from the candidates of the sets of the sizes and the orientations of the plurality of documents.

11 Claims, 23 Drawing Sheets

(56) References Cited

U.S. PATENT DOCUMENTS

2016/0014290 A1\* 1/2016 Mizuno ............... H04N 1/3875
 358/1.2
2018/0034991 A1\* 2/2018 Osada ................. H04N 1/3935

\* cited by examiner

FIG.21

| No. | SPECIFIED READING SIZE (0201) | GENERATED IMAGE DATA (0202) |
|---|---|---|
| 1 | AUTOMATIC | |
| 2 | LDR PORTRAIT | |
| 3 | LTR PORTRAIT | |
| 4 | LTR LANDSCAPE | |

FIG.23

| No. | SPECIFIED READING SIZE (0401) | GENERATED IMAGE DATA (0402) |
|---|---|---|
| 1 | AUTOMATIC — 0403, 0405, 0404 | 0408 |
| 2 | STMT PORTRAIT — 0406, 0407 | 0409 |

IMAGE PROCESSING APPARATUS, CONTROL METHOD FOR IMAGE PROCESSING APPARATUS, AND STORAGE MEDIUM

BACKGROUND

Field

The present disclosure relates to an image processing apparatus, a control method for an image processing apparatus, and a storage medium.

Description of the Related Art

There is known an image processing apparatus that detects the size of a document set on an automatic document feeding device (auto document feeder (ADF)), using a document size detection sensor, and performs a reading process for reading the document based on the detected size (see Japanese Patent Application Laid-Open No. 9-297434).

In Japanese Patent Application Laid-Open No. 9-297434, however, in a case where a document in a size that cannot be detected by the document size detection sensor of the automatic document feeding device is set on the automatic document feeding device, the reading process cannot be performed in a size intended by a user.

FIGS. 20 and 21 illustrates an example of a case where a reading size is specified for a document of which the size can be correctly detected by the document size detection sensor, and the document is read. FIG. 20 illustrates a document 0101 in a ledger (LDR) size (11×17 inches) as an example of the document of which the size can be correctly detected by the document size detection sensor. FIG. 21 is an example of image data 0202 generated by specifying a reading size 0201 for the document 0101 placed in a portrait orientation (an orientation in which the short side of the document is at the front in the conveyance direction) on the automatic document feeding device and reading the document 0101. FIG. 21 illustrates four sizes, namely "automatic", "LDR portrait", "LTR portrait", and "LTR landscape", as examples of the specified reading size 0201. A black circle in FIG. 21 indicates a document reading reference position 0203. Since the LDR size of the document 0101 set on the automatic document feeding device is correctly detected by the document size detection sensor, the document reading reference position 0203 is at the upper right of the document 0101. A dashed line 0204 in FIG. 21 indicates the range of image data to be ultimately generated in the document 0101 with reference to the document reading reference position 0203. FIG. 21 illustrates generated image data 0205 obtained in a case where the specified reading size is "automatic", generated image data 0206 obtained in a case where the specified reading size is "LDR portrait", generated image data 0207 obtained in a case where the specified reading size is "LTR portrait", and generated image data 0208 obtained in a case where the specified reading size is "LTR landscape". A letter (LTR) size is 8.5×11 inches. In a case where the size of a document set on the automatic document feeding device can be correctly detected by the document size detection sensor, as illustrated in FIG. 21, image data corresponding to the specified reading size can be generated with reference to the upper right of the document.

Next, FIGS. 22 and 23 illustrate an example of a case where a reading size is specified for a document of which the size cannot be correctly detected by the document size detection sensor. FIG. 22 illustrates a document 0301 in a statement (STMT) size (5.5×8.5 inches) as an example of the document of which the size cannot be correctly detected by the document size detection sensor. A description is given on the assumption that the automatic document feeding device cannot correctly detect the size of the document 0301 in the STMT size placed in the portrait orientation, and thus incorrectly detects the document 0301 as a document in the STMT size placed in a landscape orientation. FIG. 23 is an example of image data 0402 generated by specifying a reading size 0401 for the document 0301 placed in the portrait orientation on the automatic document feeding device and reading the document 0301. FIG. 23 illustrates two sizes, namely "automatic" and "STMT portrait", as examples of the specified reading size 0401. A black circle in FIG. 23 indicates a document reading reference position 0403. However, since the document size detection sensor cannot correctly detect that the document 0301 in the STMT size is placed in the portrait orientation, the document reading reference position 0403 is not at the upper right of the document 0301, which is a proper position indicated by a white circle 0405. In this example of the automatic document feeding device, as a result of the incorrect detection, the document reading reference position 0403 is determined by assuming that the document 0301 in the STMT size is placed in the landscape orientation. A dashed line 0404 in FIG. 23 indicates the range of image data to be ultimately generated in the document 0301 with reference to the document reading reference position 0403. FIG. 23 illustrates generated image data 0408 obtained in a case where the specified reading size is "automatic", and generated image data 0409 obtained in a case where the specified reading size is "STMT portrait". In a case where the specified reading size is "automatic", and even if the document 0301 actually placed on the automatic document feeding device is a document in the STMT size in the portrait orientation, a size detection result indicates a document in the STMT size in the landscape orientation. Thus, as indicated by the generated image data 0408, the document 0301 cannot be correctly read. Even if the specified reading size is set to "STMT portrait" according to the orientation in which the document 0301 is actually placed, a size detection result indicates a document in the STMT size in the landscape orientation. Thus, the reading reference position of the document 0301 is not a position 0407, but a position 0406 corresponding to the upper right of the document 0301 in the STMT size in the landscape orientation. The result of generating image data in the "STMT portrait" size with reference to the position 0406 is the generated image data 0409. As described above, in a case where the size of a document set on the automatic document feeding device cannot be correctly detected by the document size detection sensor, image data according to the specified reading size is generated with reference to the upper right of the incorrectly detected document size, not the upper right of the actual document.

SUMMARY

According to an aspect of the present disclosure, an image processing apparatus includes a conveyance unit configured to convey a document set on a document tray, a document detection sensor provided on the document tray, a determining unit configured to determine, based on a signal from the document detection sensor, a size of the document and an orientation of the document, a reading unit configured to read the document conveyed by the conveyance unit, a selection unit configured to select, from among candidates of sets of sizes and orientations of a plurality of documents that can be conveyed by the conveyance unit, a set of a reading size and a reading orientation of the document, a determination unit configured to determine whether there is a set of a size and an orientation of a document of which the orientation cannot be correctly determined by the determining unit among the sets of the sizes and the orientations of the plurality of documents that can be conveyed by the conveyance unit, and a control unit configured to set candidates to be selected by the selection unit, wherein, in a case where the determination unit determines that there is not a set of a size and an orientation of a document of which the orientation cannot be correctly determined by the determining unit, the control unit sets, as candidates to be selected by the selection unit, the candidates of the sets of the sizes and the orientations of the plurality of documents, and wherein, in a case where the determination unit determines that there is a set of a size and an orientation of a document of which the orientation cannot be correctly determined by the determining unit, the control unit sets, as candidates to be selected by the selection unit, candidates obtained by excluding the set of the size and the orientation of the document of which the orientation cannot be correctly determined by the determining unit from the candidates of the sets of the sizes and the orientations of the plurality of documents.

Further features of the present disclosure will become apparent from the following description of exemplary embodiments with reference to the attached drawings.

BRIEF DESCRIPTION OF THE DRAWINGS

FIG. 21 is a diagram illustrating an example of image data generated by specifying a reading size for the document and reading the document using an automatic document feeding device.

FIG. 23 is a diagram illustrating an example of image data generated by specifying a reading size for the document and reading the document using the automatic document feeding device.

DESCRIPTION OF THE EMBODIMENTS

With reference to the attached drawings, exemplary embodiments of the present disclosure will be described in detail below. The following exemplary embodiments are not intended to limit the present disclosure according to the appended claims, and not all the combinations of the features described in the exemplary embodiments are essential.

Figure 1:
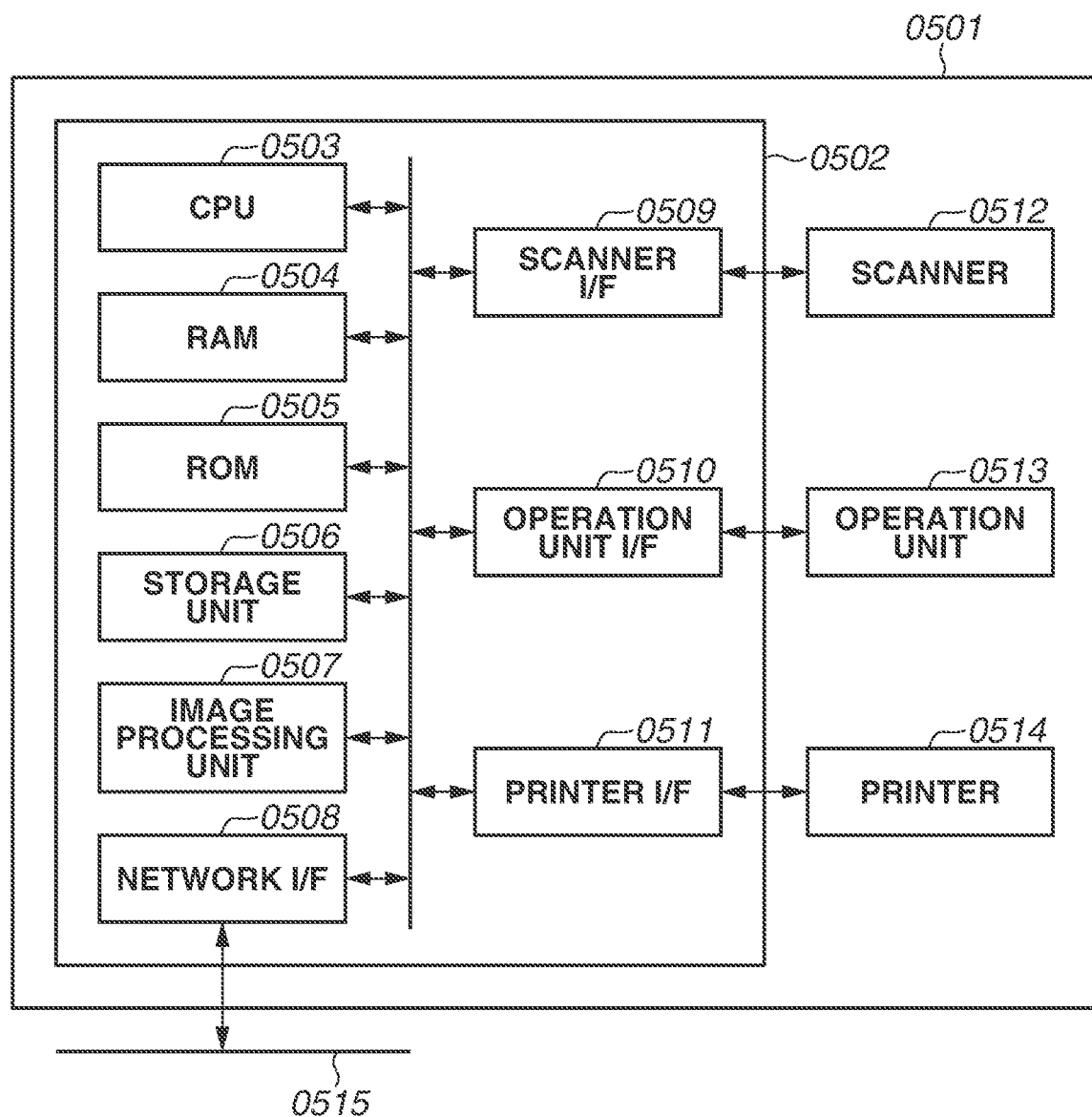
FIG. 1 is a block diagram illustrating a system of an image processing apparatus according to an exemplary embodiment.

FIG. 1 is a block diagram illustrating an example of a configuration of an image processing apparatus 0501 according to a first exemplary embodiment. The image processing apparatus 0501 is, for example, a multifunction peripheral (MFP).

A control unit 0502 is connected to a scanner 0512, which is an image input device, and a printer 0514, which is an image output device, and controls the input and output of image information. In addition, the control unit 0502 is connected to a local area network (hereinafter, referred to as network) 0515 and transmits a transmission job via the network 0515.

A central processing unit (CPU) 0503 performs overall control of the operation of the image processing apparatus 0501.

A random-access memory (RAM) 0504 functions as a work area for the CPU 0503.

A read-only memory (ROM) 0505 stores a boot program for a system, and other programs.

A storage unit 0506 stores system software, image data, and a program for controlling the operation of the image processing apparatus 0501.

The CPU 0503 controls various operations of the image processing apparatus 0501 by loading a program stored in the storage unit 0506 or the ROM 0505 into the RAM 0504 and executing the program.

An image processing unit 0507 performs various image editing processes on image data input from a scanner interface (I/F) 0509 and image data received via the network 0515.

A network I/F 0508 is connected to the network 0515 and controls input and output of various pieces of information via the network 0515.

The scanner I/F 0509 connects the scanner 0512, which is an image input device, and the control unit 0502. The scanner 0512 reads an image of a document, thereby generating image data representing the read image. The generated image data is transmitted to the control unit 0502.

An operation unit I/F 0510 is an interface for connecting an operation unit 0513 and the control unit 0502. The operation unit 0513 is composed of a touch panel including a display unit and a touch panel sheet, and a hardware key including a numeric keypad and a start key. The operation unit I/F 0510 transmits information input through the operation unit 0513 by a user to the CPU 0503. Further, the operation unit I/F 0510 transmits, to the operation unit 0513, information regarding a screen to be displayed on the touch panel of the operation unit 0513.

A printer I/F 0511 connects the printer 0514, which is an image output device, and the control unit 0502. Based on image data transmitted from the control unit 0502, the printer 0514 prints an image on a sheet conveyed from a sheet feeding cassette.

Although the present exemplary embodiment is described using an MFP as an example of the image processing apparatus 0501, the image processing apparatus 0501 may not include the printer 0514 and the printer I/F 0511.

Figure 2A:
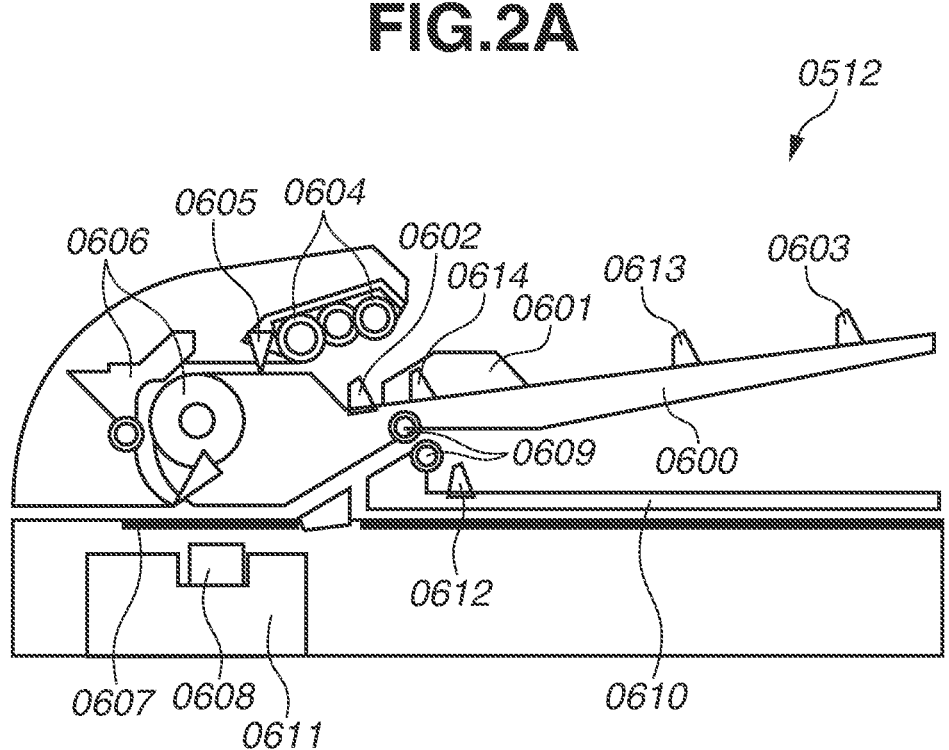
FIGS. 2A and 2B are diagrams illustrating an automatic document feeding device according to the exemplary embodiment.
Figure 2B:
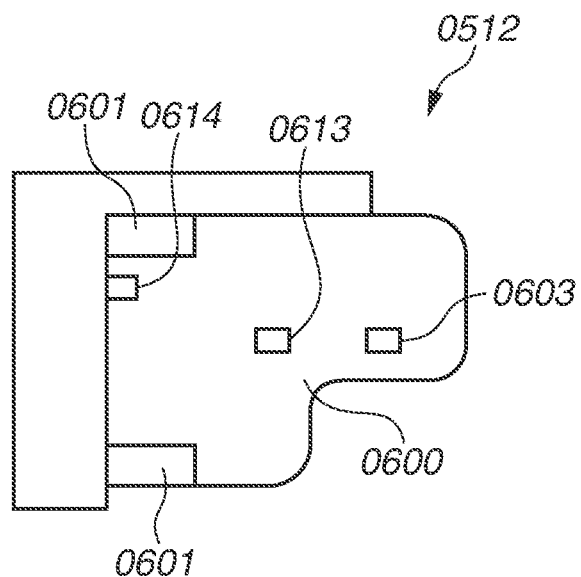

FIGS. 2A and 2B are diagrams illustrating an automatic document feeding device of the scanner 0512. The automatic document feeding device is also referred to as an "auto document feeder (ADF)".

FIG. 2A is a side cross-sectional view illustrating an internal structure of the automatic document feeding device of the scanner 0512. The automatic document feeding device includes a document tray 0600 for stacking a document to be read. On the document tray 0600, two document guides 0601 are provided, and a document sensor 0602 for detecting the presence or absence of the document and three document size detection sensors 0603, 0613, and 0614 are arranged. The document guides 0601 can move in a direction perpendicular to the conveyance direction of the document. The document guides 0601 are moved by the user to the positions where the document guides 0601 are in contact with both ends in the main scanning direction of the document placed on the document tray 0600, and thereby can stabilize the conveyance of the document. The two document guides 0601 are provided side by side in the vertical direction of the document (perpendicular to the conveyance direction of the document), and the document stacked on the document tray 0600 is conveyed by three sets of rollers, i.e., pickup rollers 0604, conveyance rollers 0606, and sheet discharge rollers 0609. The pickup rollers 0604 are rollers for conveying the document stacked on the document tray 0600 into a document conveyance path within the automatic document feeding device. The conveyance rollers 0606 convey the document conveyed into the document conveyance path by the pickup rollers 0604. The sheet discharge rollers 0609 convey the document conveyed by the conveyance rollers 0606 to a sheet discharge tray 0610. In the sheet discharge tray 0610, a sheet discharge tray document sensor 0612 for detecting the presence or absence of the document conveyed to the sheet discharge tray 0610 is provided. The document conveyed by the pickup rollers 0604 is detected by a document passage detection sensor 0605, and based on the detection time, it is determined whether the passage of the first document is completed. Although not illustrated, the conveyance rollers 0606, the pickup rollers 0604, and the sheet discharge rollers 0609 are all driven by stepping motors. The document conveyed by the automatic document feeding device is read through a reading window 0607 of the automatic document feeding device by a contact image sensor (CIS) 0608 included in a sensor unit 0611 located below the reading window 0607. The sensor unit 0611 can freely move in the sub-scanning direction and can also move in the same direction as the conveyance direction of the document conveyed from the conveyance rollers 0606 to the sheet discharge rollers 0609. The reading window 0607 of the automatic document feeding device has a certain length in the sub-scanning direction. The CIS 0608 can be moved to any position in the range of this length and read the document at the position to which the CIS 0608 is moved. The CIS 0608 is composed of photoelectric conversion elements such as a charge-coupled device sensor. The CIS 0608 simultaneously performs first-in-first-out (FIFO) for accumulating an image in each element and generates control signals for controlling the FIFO and the CCD sensor. Generally, the CIS 0608 is implemented by arranging a plurality of photoelectric conversion elements in a line.

FIG. 2B is a top view of the automatic document feeding device of the scanner 0512. The document is conveyed to the left in FIG. 2B. Table 1 below illustrates various document sizes and the responses of the three document size detection sensors 0603, 0613, and 0614 in a case where the document is placed on the automatic document feeding device. From the table 1, for example, in a case where a document in a ledger (LDR) size is placed in a portrait orientation (an orientation in which the short side of the document is at the front in the conveyance direction) on the automatic document feeding device, all the three document size detection sensors 0603, 0613, and 0614 are on. Similarly, in a case where a document in a legal (LGL) size is placed in the portrait orientation, the document size detection sensors except for the document size detection sensor 0614 are on. The responses of the three document size detection sensors 0603, 0613, and 0614 to a document in a letter (LTR) size in the portrait orientation and the document in the LTR size in a landscape orientation are also as illustrated below in the table 1. According to the table 1, based on the responses of the sensors according to the size and the orientation of the document placed on the automatic document feeding device, the size and the orientation can be correctly detected. However, in each of a case where a document in a statement (STMT) size is placed in the portrait orientation and a case where the document in the STMT size is placed in the landscape orientation, all the document size detection sensors 0603, 0613, and 0614 are off. In other words, this indicates that the scanner 0512 cannot detect which of the portrait and landscape orientations the document in the STMT size on the automatic document feeding device is placed in. For this reason, in a case where all the document size detection sensors 0603, 0613, and 0614 are off, the scanner 0512 is set to detect that the document in the STMT size is placed in the landscape orientation. Then, in a case where the document in the STMT size is placed in the portrait orientation, the scanner 0512 cannot detect the orientation of the document.

TABLE 1

| | | Document Size Detection Sensor | | | Document Size |
| --- | --- | --- | --- | --- | --- |
| | | 0614 | 0613 | 0603 | Detection Result |
| Document Size and Placement Orientation | LDR Portrait | ON | ON | ON | LDR Portrait |
| | LGL Portrait | OFF | ON | ON | LGL Portrait |
| | LTR Portrait | OFF | ON | OFF | LTR Portrait |
| | LTR Landscape | ON | OFF | OFF | LTR Landscape |
| | STMT Portrait | OFF | OFF | OFF | STMT Landscape |
| | STMT Landscape | OFF | OFF | OFF | STMT Landscape |

Figure 3:
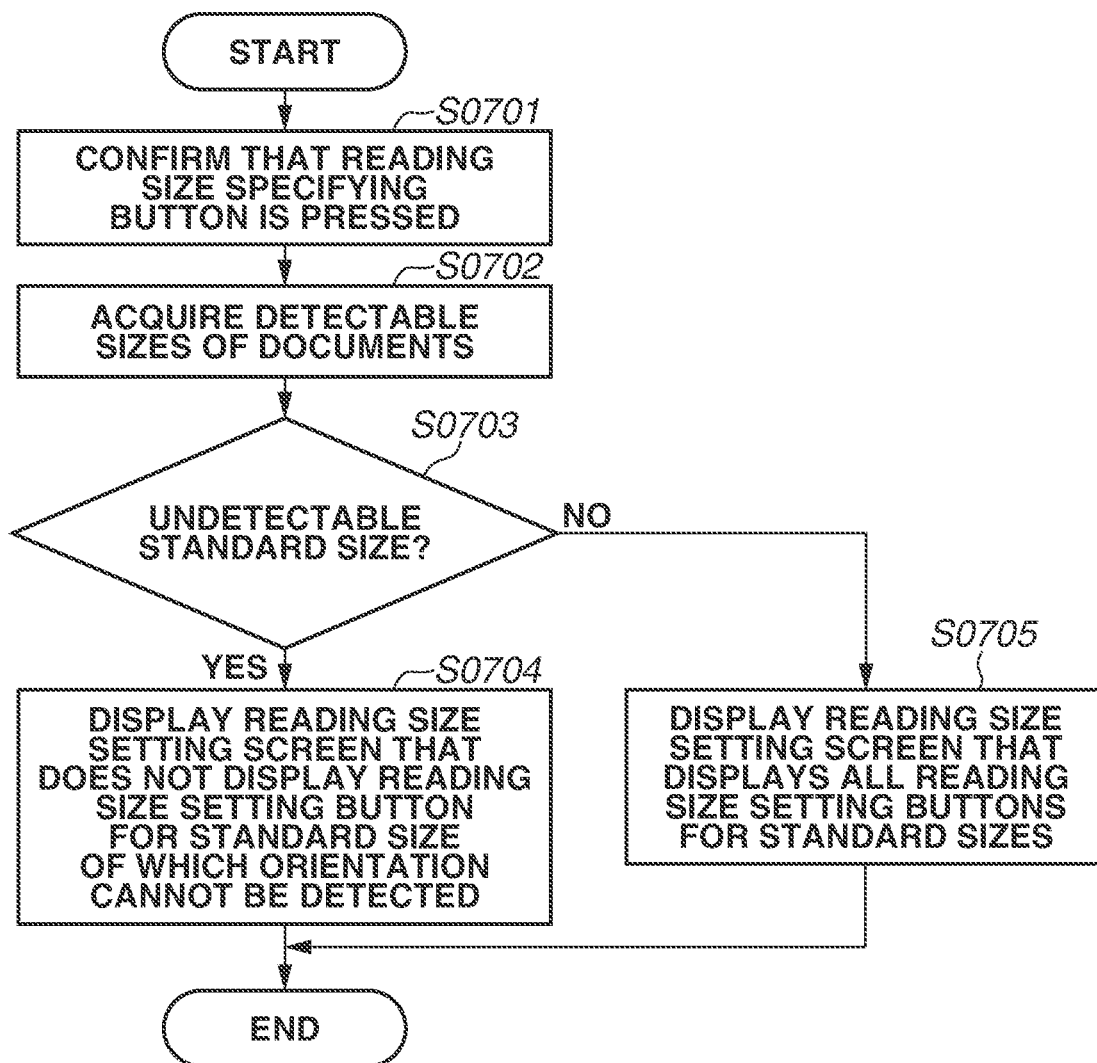
FIG. 3 is a flowchart illustrating display control procedure of a reading size setting screen according to the exemplary embodiment.

Next, with reference to a flowchart in FIG. 3, a description is given of a method for, according to sizes that can be detected by the automatic document feeding device, switching the display of a screen for specifying a reading size that is displayed on the operation unit 0513. Steps illustrated in the flowchart in FIG. 3 are implemented by the CPU 0503 loading a program stored in the ROM 0505 into the RAM 0504 and executing the program.

In step S0701, the CPU 0503 confirms that a reading size specifying button for displaying a screen for setting a reading size is pressed on the operation unit 0513.

In step S0702, the CPU 0503 acquires sizes of documents that can be detected by the automatic document feeding device of the scanner 0512.

In step S0703, based on the detectable sizes of documents, acquired in step S0702, the CPU 0503 determines whether there is a standard size of which the orientation cannot be detected. In a case where the detectable sizes of documents are illustrated in the table 1, the STMT size in the portrait orientation and the STMT size in the landscape orientation are different in the document size and the placement orientation, but obtain the same document size detection results, i.e., the STMT size in the landscape orientation. Thus, the image processing apparatus 0501 cannot detect the STMT size in the portrait orientation. This is because if a document in the STMT size in the portrait orientation is set, the document is detected as the document in the STMT size in the landscape orientation. Thus, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S0703), the processing proceeds to step S0704. On the other hand, if the CPU 0503 determines that there is not a standard size of which the orientation cannot be detected (NO in step S0703), the processing proceeds to step S0705.

In step S0705, the CPU 0503 displays on the operation unit 0513 a reading size setting screen that displays, as candidates for the reading size, all reading size setting buttons for standard sizes that can be read by the image processing apparatus 0501.

Figure 4:
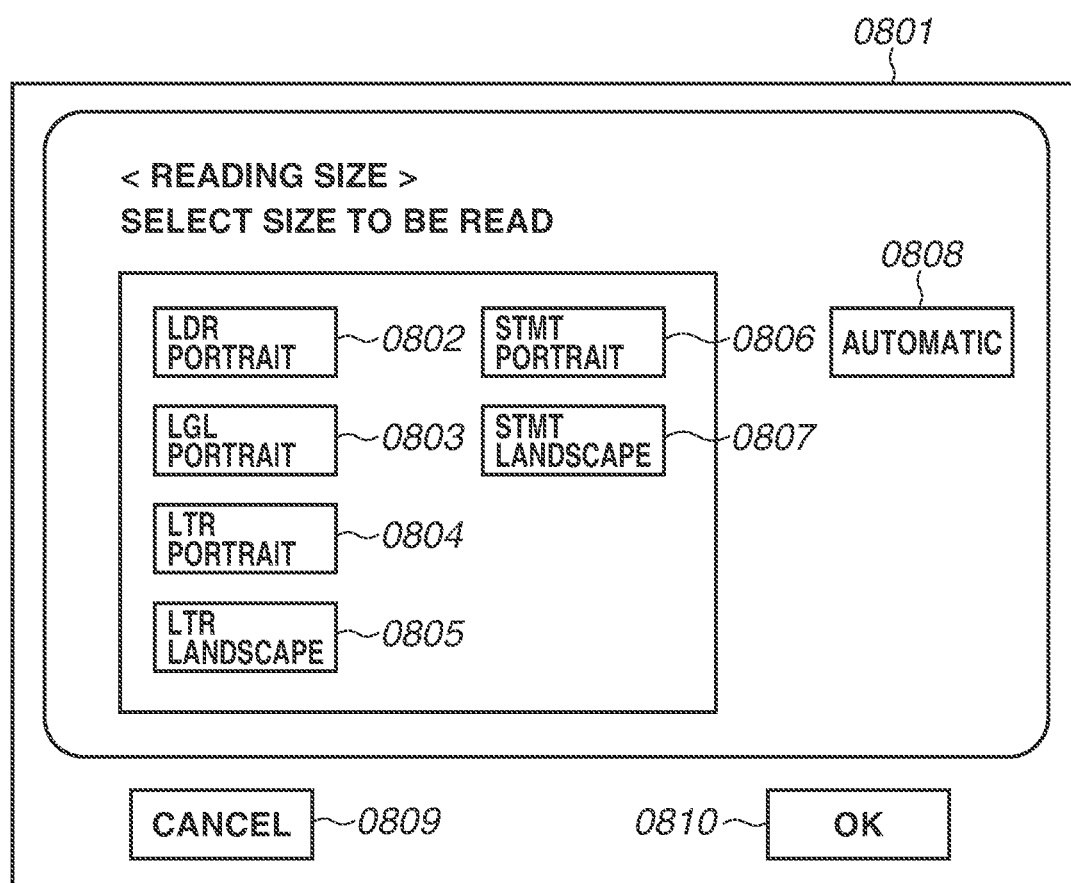
FIG. 4 is a diagram illustrating an example of a screen for receiving a reading size setting according to the exemplary embodiment.

FIG. 4 is an example of the reading size setting screen displayed in step S0705. On a screen 0801, buttons 0802, 0803, 0804, 0805, 0806, and 0807 for specifying the reading size of a document that can be read by the image processing apparatus 0501 are arranged, and the specifying including the size and the orientation can be performed. The buttons are examples of objects, and instead of displaying a plurality of buttons next to each other, records of sizes may be displayed next to each other on a list. A button 0808 is a button for giving an instruction to perform reading with a size detected by the document size detection sensors 0603, 0613, and 0614. Additionally, a cancel button 0809 for cancelling the setting and an OK button 0810 for finalizing the setting are arranged.

If the OK button 0810 is selected in the state where any of the buttons 0802 to 0807 is selected, the CPU 0503 determines the size and the orientation corresponding to the selected button as the reading size and the orientation and stores the reading size and the orientation in the RAM 0504. Then, if the CPU 0503 receives a job start instruction through the start key of the operation unit 0513, the CPU 0503 instructs the scanner 0512 to convey the document and controls the scanner 0512 to read an image in the size and the orientation stored in the RAM 0504. If a copy job is set to be executed, the CPU 0503 causes the printer 0514 to execute printing based on image data generated by reading the image. If a data transmission job is set to be executed, the CPU 0503 transmits image data generated by reading the image to a specified destination via the network 0515. If a saving job is set to be executed, the CPU 0503 saves image data generated by reading the image in the storage unit 0506.

In step S0704, the CPU 0503 displays on the operation unit 0513 a reading size setting screen that does not include a reading size setting button for the standard size of which the orientation cannot be detected.

Figure 5:
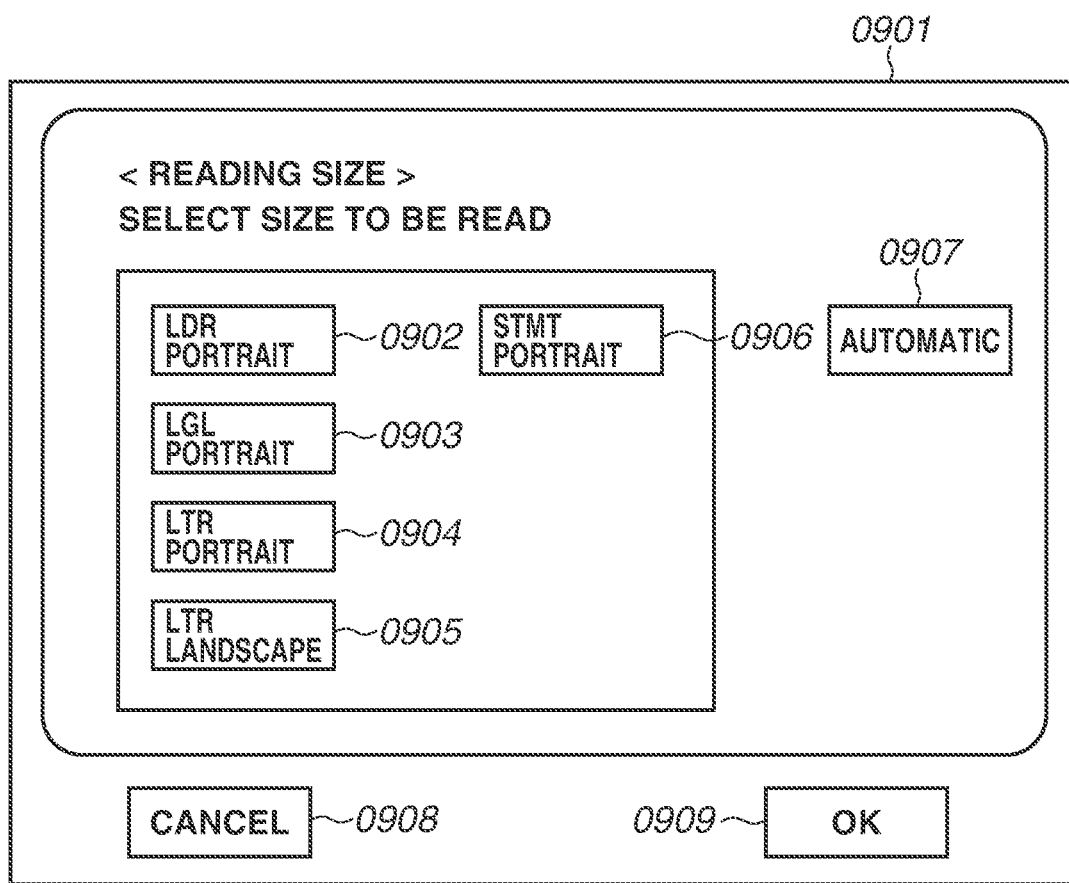
FIG. 5 is a diagram illustrating an example of a screen for receiving a reading size setting according to the exemplary embodiment.

FIG. 5 is an example of the reading size setting screen displayed in step S0704. On a screen 0901, buttons 0902, 0903, 0904, 0905, and 0906 for specifying the reading size of a document are arranged, and the specifying including the size and the orientation can be performed. On the screen 0901, unlike the screen 0801, an "STMT landscape" button is not displayed. A button 0907 is a button for giving an instruction to perform reading with a size detected by the document size detection sensors 0603, 0613, and 0614. Additionally, a cancel button 0908 for cancelling the setting and an OK button 0909 for finalizing the setting are arranged.

If the OK button 0909 is selected in the state where any of the buttons 0902 to 0906 is selected, the CPU 0503 determines the size and the orientation corresponding to the selected button as the reading size and the reading orientation and stores the reading size and the reading orientation in the RAM 0504. Then, if the CPU 0503 receives a job start instruction through the start key of the operation unit 0513, the CPU 0503 instructs the scanner 0512 to convey the document and controls the scanner 0512 to read an image in the size and the orientation stored in the RAM 0504.

If the OK button 0909 is selected in the state where any of the buttons 0902 to 0906 is selected, the CPU 0503 determines the size corresponding to the selected button as the reading size and stores the reading size in the RAM 0504. Then, if the CPU 0503 receives a job start instruction through the start key of the operation unit 0513, the CPU 0503 instructs the scanner 0512 to convey the document and controls the scanner 0512 to read an image in the reading size stored in the RAM 0504. If a copy job is set to be executed, the CPU 0503 causes the printer 0514 to execute printing based on image data generated by reading the image. If a data transmission job is set to be executed, the CPU 0503 transmits image data generated by reading the image to a specified destination via the network 0515. If a saving job is set to be executed, the CPU 0503 saves image data generated by reading the image in the storage unit 0506.

In the case of an image processing apparatus having a detection capability as described in the table 1 as in the present exemplary embodiment, the image processing apparatus cannot distinguish the STMT size in the portrait orientation and the STMT size in the landscape orientation, and therefore displays a size setting screen that does not include a selection button for selecting the STMT size in the landscape orientation as illustrated in FIG. 5.

Screen data for displaying a screen that does not include a reading size setting button for a standard size that cannot be detected may be prepared separately from screen data for displaying a screen that includes the reading size setting button for the standard size that cannot be detected. However, the present disclosure is not limited to this. In a case where there is a standard size that cannot be detected, a selection button for selecting the standard size that cannot be detected may be deleted from screen data for displaying a screen that includes the reading size setting button for the standard size that cannot be detected. Instead of hiding a reading size setting button for a standard size that cannot be detected, for example, the reading size setting button for the standard size that cannot be detected may be displayed in a grayed-out state so that the reading size setting button cannot be selected by the user.

As described above, the display of a size specifying button on a reading size specifying screen is switched based on the document detection capability of the automatic document feeding device, whereby it is possible to prevent the generation of a resulting product unintended by the user.

In the first exemplary embodiment, the description has been given of the method for switching the display of a size specifying button on a reading size specifying screen based on the document detection capability of the automatic document feeding device. However, in addition to reading a document using the automatic document feeding device, the scanner 0512 can also read a document placed on a document platen, using the sensor unit 0611.

In a second exemplary embodiment, an example is described where, further depending on whether a document is placed on the automatic document feeding device, a reading size specifying screen to be displayed is changed.

The configuration of the image processing apparatus and the hardware configuration of the automatic document feeding device are similar to those in the first exemplary embodiment, and therefore are not described here.

Figure 6:
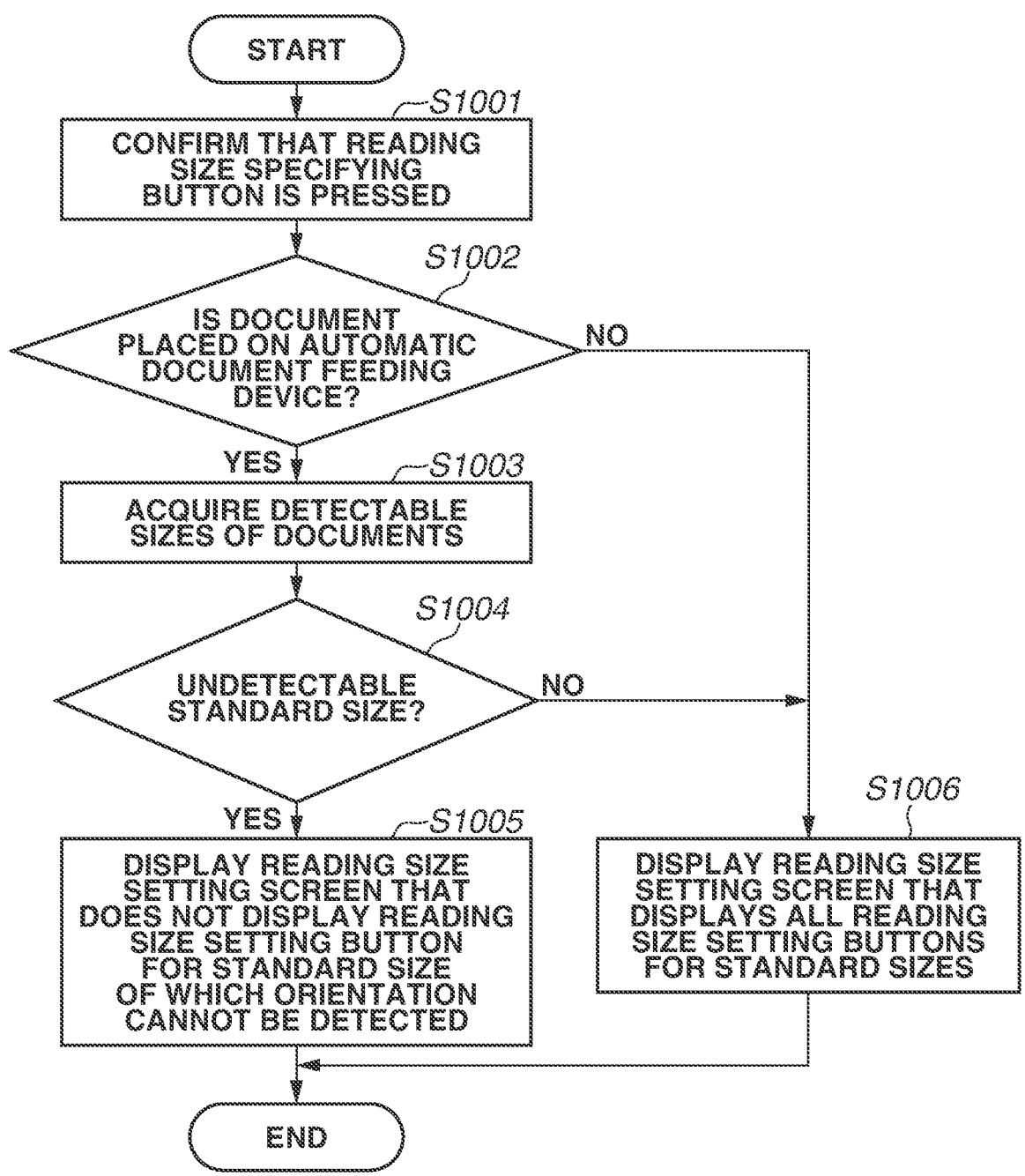
FIG. 6 is a flowchart illustrating a display control procedure of a reading size setting screen according to an exemplary embodiment.

With reference to a flowchart in FIG. 6, a description is given of a method for, depending on sizes that can be detected by the automatic document feeding device and whether a document is placed on the automatic document feeding device, changing the display of a screen for specifying a reading size that is displayed on the operation unit 0513. Steps illustrated in the flowchart in FIG. 6 are implemented by the CPU 0503 loading a program stored in the ROM 0505 into the RAM 0504 and executing the program.

In step S1001, the CPU 0503 confirms that a reading size specifying button for displaying a screen for setting a reading size is pressed on the operation unit 0513.

In step S1002, based on the presence or absence of a signal from the document sensor 0602, the CPU 0503 determines whether a document is placed on the automatic document feeding device. If the CPU 0503 receives from the document sensor 0602 a signal indicating that a document is set, the CPU 0503 determines that a document is placed on the automatic document feeding device (YES in step S1002), and the processing proceeds to step S1003. If the CPU 0503 does not receive from the document sensor 0602 the signal indicating that a document is set, the CPU 0503 determines that a document is not placed on the automatic document feeding device (NO in step S1002), and the processing proceeds to step S1006. Instead of determining whether a document is not placed on the automatic document feeding device, if a document detection sensor for detecting a document placed on the document platen determines that a document is placed on the document platen, the processing may proceed to step S1006.

In step S1003, the CPU 0503 acquires sizes of documents detectable by the automatic document feeding device of the scanner 0512.

In step S1004, based on the detectable sizes of documents acquired in step S1002, the CPU 0503 determines whether there is a standard size of which the orientation cannot be detected. In a case where the detectable sizes of documents are illustrated in table 1, the STMT size in the portrait orientation and the STMT size in the landscape orientation are different in the document size and the placement orientation, but obtain the same document size detection results, i.e., the STMT size in the landscape orientation. Thus, the image processing apparatus 0501 cannot detect the STMT size in the portrait orientation. This is because if a document in the STMT size in the portrait orientation is set, the document is detected as the document in the STMT size in the landscape orientation. With this reason, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S1004), the processing proceeds to step S1005. On the other hand, if the CPU 0503 determines that there is not a standard size of which the orientation cannot be detected (NO in step S1004), the processing proceeds to step S1006.

In step S1006, the CPU 0503 displays on the operation unit 0513 a reading size setting screen that displays all reading size setting buttons for standard sizes that can be read by the image processing apparatus 0501.

FIG. 4 is an example of the reading size setting screen displayed in step S1006. On a screen 0801, buttons 0802 to 0807 for specifying the reading size and the orientation of a document that can be read by the image processing apparatus 0501 are arranged, and the specifying including the size and the orientation can be performed. A button 0808 is a button for giving an instruction to perform reading with a size detected by the document size detection sensors 0603, 0613, and 0614. Additionally, a cancel button 0809 for cancelling the setting and an OK button 0810 for finalizing the setting are arranged.

If the OK button 0810 is selected in a state where any of the buttons 0802 to 0807 is selected, the CPU 0503 determines the size and the orientation corresponding to the selected button as the reading size and the reading orientation and stores the reading size and the reading orientation in the RAM 0504. Then, if the CPU 0503 receives a job start instruction through the start key of the operation unit 0513, the CPU 0503 instructs the scanner 0512 to convey the document and controls the scanner 0512 to read an image in the reading size and the reading orientation stored in the RAM 0504. If a copy job is set to be executed, the CPU 0503 causes the printer 0514 to execute printing based on image data generated by reading the image. If a data transmission job is set to be executed, the CPU 0503 transmits image data generated by reading the image to a specified destination via the network 0515. If a saving job is set to be executed, the CPU 0503 saves image data generated by reading the image in the storage unit 0506.

In step S1005, the CPU 0503 displays on the operation unit 0513 a reading size setting screen that does not include a reading size setting button for the standard size of which the orientation cannot be detected.

FIG. 5 is an example of the reading size setting screen displayed in step S1005. On a screen 0901, buttons 0902 to 0906 for specifying the reading size of a document are arranged, and the specifying including the size and the orientation can be performed. A button 0907 is a button for giving an instruction to perform reading with a size detected by the document size detection sensors 0603, 0613, and 0614. Additionally, a cancel button 0908 for cancelling the setting and an OK button 0909 for finalizing the setting are placed.

If the OK button 0909 is selected in a state where any of the buttons 0902 to 0906 is selected, the CPU 0503 determines the size and the orientation corresponding to the selected button as the reading size and the reading orientation and stores the reading size and the reading orientation in the RAM 0504. Then, if the CPU 0503 receives a job start instruction through the start key of the operation unit 0513, the CPU 0503 instructs the scanner 0512 to convey the document and controls the scanner 0512 to read an image in the reading size and the reading orientation stored in the RAM 0504. If a copy job is set to be executed, the CPU 0503 causes the printer 0514 to execute printing based on image data generated by reading the image. If a data transmission job is set to be executed, the CPU 0503 transmits image data generated by reading the image to a specified destination via the network 0515. If a saving job is set to be executed, the CPU 0503 saves image data generated by reading the image in the storage unit 0506.

As described above, the display of a size specifying button on a reading size specifying screen is switched based on the document detection capability of the automatic document feeding device, whereby it is possible to prevent the generation of a resulting product unintended by the user. Additionally, in a case where a document is read on the document platen, it is possible to specify a reading size for even a standard size that cannot be detected by the document detection capability of the automatic document feeding device.

In the second exemplary embodiment, steps S1003 and S1004 may not be executed. In this case, if it is determined in step S1002 that a document is placed on the automatic document feeding device, the processing proceeds to step S1005.

In the second exemplary embodiment, the description has been given of the method for switching the display of the size specifying button on the reading size specifying screen based on the document detection capability of the automatic document feeding device and whether a document is placed on the automatic document feeding device.

In a case where the user specifies a reading size, a size specified as the reading size and a document size do not necessarily match each other. In a case where only a part of a document is read, the document size may be larger than the reading size. For example, a case is possible where only an upper portion of a document in the LTR size in the portrait orientation is needed, and the STMT size in the landscape orientation is specified in the specifying of the reading size.

With the method in the second exemplary embodiment, in the case of a size beyond the document size detection capability of the automatic document feeding device, the reading of only a part of a document as described above is not possible.

In a third exemplary embodiment, a description is given of a method for, further in a case where a document is placed on the automatic document feeding device, receiving a detected size based on the document size detection sensors 0603, 0613, and 0614 and changing a reading size specifying screen to be displayed.

The configuration of the image processing apparatus and the hardware configuration of the automatic document feeding device are similar to those in the first exemplary embodiment, and thus are not described here.

Figure 7:
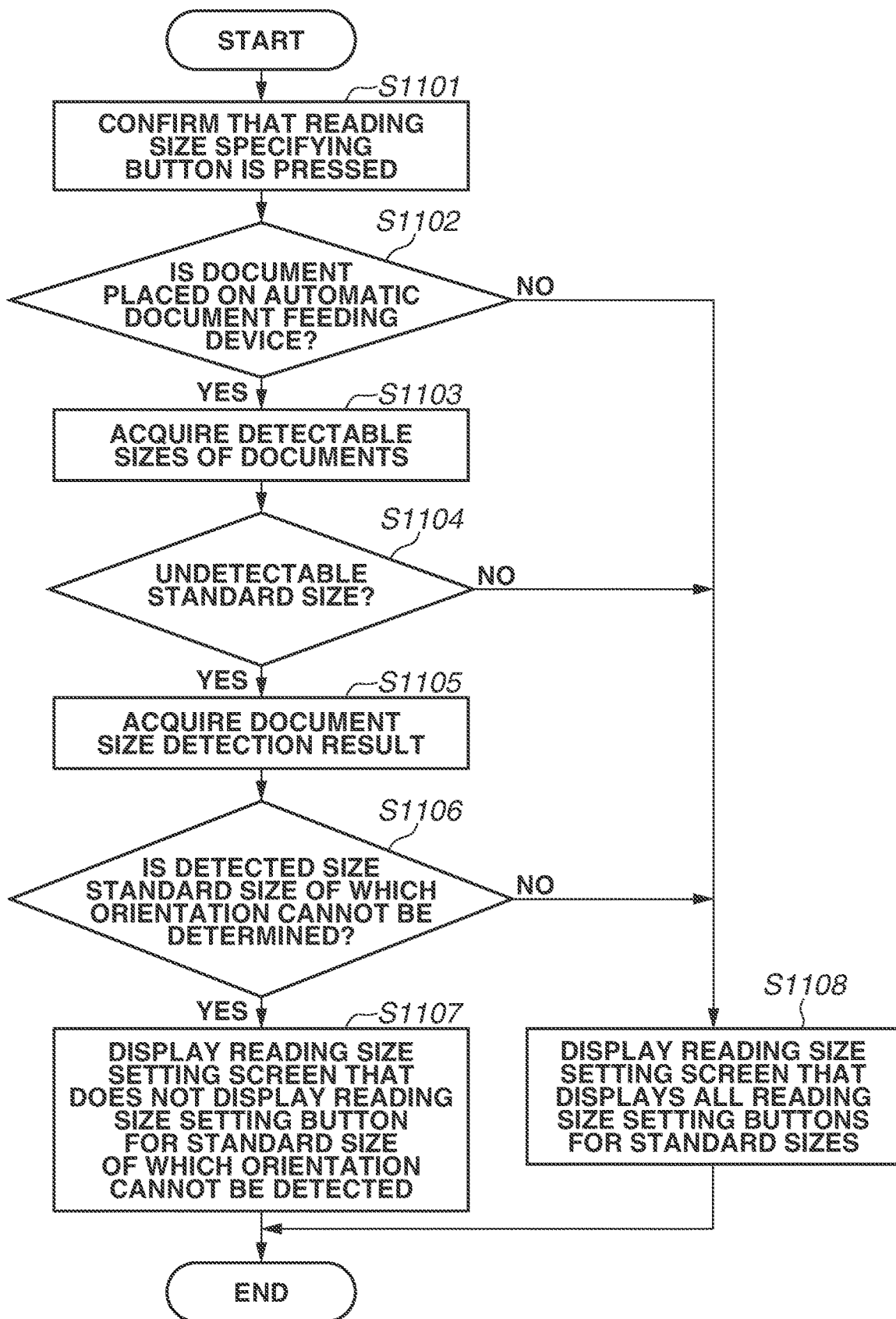
FIG. 7 is a flowchart illustrating a display control procedure of a reading size setting screen according to an exemplary embodiment.

Next, with reference to a flowchart in FIG. 7, a description is given of a method for, taking into account a size detected by the document size detection sensors 0603, 0613, and 0614, changing the display of a screen for specifying a reading size that is displayed on the operation unit 0513. Steps illustrated in the flowchart in FIG. 7 are implemented by the CPU 0503 loading a program stored in the ROM 0505 into the RAM 0504 and executing the program.

In step S1101, the CPU 0503 confirms that a reading size specifying button for displaying a screen for setting a reading size is pressed on the operation unit 0513.

In step S1102, based on the presence or absence of a signal from the document sensor 0602, the CPU 0503 determines whether a document is placed on the automatic document feeding device. If the CPU 0503 receives from the document sensor 0602 a signal indicating that a document is set, the CPU 0503 determines that a document is placed on the automatic document feeding device (YES in step S1102), and the processing proceeds to step S1103. If the CPU 0503 does not receive from the document sensor 0602 the signal indicating that a document is set, the CPU 0503 determines that a document is not placed on the automatic document feeding device (NO in step S1102), and the processing proceeds to step S1108. Instead of determining whether a document is not placed on the automatic document feeding device, if the document detection sensor for detecting a document placed on the document platen determines that a document is placed on the document platen, the processing may proceed to step S1108.

In step S1103, the CPU 0503 acquires sizes of documents detectable by the automatic document feeding device of the scanner 0512.

In step S1104, based on the detectable sizes of documents acquired in step S1103, the CPU 0503 determines whether there is a standard size of which the orientation cannot be detected. In a case where the detectable sizes of documents are as illustrated in the table 1, the STMT size in the portrait orientation and the STMT size in the landscape orientation are different in the document size and the placement orientation, but obtain the same document size detection results, i.e., the STMT size in the landscape orientation. In other words, the image processing apparatus 0501 cannot detect the STMT size in the portrait orientation. This is because if a document in the STMT size in the portrait orientation is set, the document is detected as the document in the STMT size in the landscape orientation. Thus, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S1104), the processing proceeds to step S1005. On the other hand, if the CPU 0503 determines that there is not a standard size of which the orientation cannot be detected (NO in step S1104), the processing proceeds to step S1108.

In step S1105, the CPU 0503 acquires a document size detection result of the automatic document feeding device of the scanner 0512.

In step S1106, based on the document size detection result acquired in step S1105, the CPU 0503 determines whether the detected document size is a standard size of which the orientation cannot be correctly determined. If the CPU 0503 determines that the detected document size is a standard size of which the orientation cannot be correctly determined (YES in step S1106), the processing proceeds to step S1107. If the CPU 0503 determines that the detected document size is not a standard size of which the orientation cannot be correctly determined (NO in step S1106), the processing proceeds to step S1108.

In step S1108, the CPU 0503 displays on the operation unit 0513 a reading size setting screen that displays all reading size setting buttons for standard sizes that can be read by the image processing apparatus 0501.

FIG. 4 is an example of the reading size setting screen displayed in step S1108. On a screen 0801, buttons 0802 to 0807 for specifying the reading size of a document that can be read by the image processing apparatus 0501 are placed, and the specifying including the size and the orientation can be performed. A button 0808 is a button for giving an instruction to perform reading with a size detected by the document size detection sensors 0603, 0613, and 0614. Additionally, a cancel button 0809 for cancelling the setting and an OK button 0810 for finalizing the setting are arranged.

If the OK button 0810 is selected in a state where any of the buttons 0802 to 0807 is selected, the CPU 0503 determines the size corresponding to the selected button as the reading size and stores the reading size in the RAM 0504. Then, if the CPU 0503 receives a job start instruction through the start key of the operation unit 0513, the CPU 0503 instructs the scanner 0512 to convey the document and controls the scanner 0512 to read an image in the reading size stored in the RAM 0504. If a copy job is set to be executed, the CPU 0503 causes the printer 0514 to execute printing based on image data generated by reading the image. If a data transmission job is set to be executed, the CPU 0503 transmits image data generated by reading the image to a specified destination via the network 0515. If a saving job is set to be executed, the CPU 0503 saves image data generated by reading the image in the storage unit 0506.

In step S1107, the CPU 0503 displays on the operation unit 0513 a reading size setting screen that does not include a reading size setting button for the standard size that cannot be detected.

FIG. 5 is an example of the reading size setting screen displayed in step S1107. On a screen 0901, buttons 0902 to 0906 for specifying the reading size of a document are arranged, and the specifying including the size and the orientation can be performed. A button 0907 is a button for giving an instruction to perform reading with a size detected by the document size detection sensors 0603, 0613, and 0614. Additionally, a cancel button 0908 for cancelling the setting and an OK button 0909 for finalizing the setting are arranged.

If the OK button 0909 is selected in a state where any of the buttons 0902 to 0906 is selected, the CPU 0503 determines the size corresponding to the selected button as the reading size and stores the reading size in the RAM 0504. Then, if the CPU 0503 receives a job start instruction through the start key of the operation unit 0513, the CPU 0503 instructs the scanner 0512 to convey the document and controls the scanner 0512 to read an image in the reading size stored in the RAM 0504. If a copy job is set to be executed, the CPU 0503 causes the printer 0514 to execute printing based on image data generated by reading the image. If a data transmission job is set to be executed, the CPU 0503 transmits image data generated by reading the image to a specified destination via the network 0515. If a saving job is set to be executed, the CPU 0503 saves image data generated by reading the image in the storage unit 0506.

As described above, in a case where a document is read on the document platen, it is possible to specify a reading size for even a standard size that cannot be detected by the document detection capability of the automatic document feeding device. Additionally, the display of a size specifying button on a reading size specifying screen is switched based on the document detection capability of the automatic document feeding device, whereby it is possible to prevent the generation of a resulting product unintended by the user. Further, based on a standard size that can be detected using a document size detection result of the automatic document feeding device, it is possible to specify a reading size in a case where only a part of a document in a size that cannot be detected is read.

Steps S1102 to S1105 are not necessarily required. After step S1101, step S1106 may be executed.

In the flowchart in FIG. 7, steps S1103 and S1104 may not be executed, and if it is determined in step S1102 that a document is placed on the automatic document feeding device, the processing may proceed to step S1105.

The example has been described where in step S1106 in the flowchart in FIG. 7, based on the document size detection result acquired in step S1105, the CPU 0503 determines whether the detected document size is a standard size of which the orientation cannot be correctly determined. However, the present disclosure is not limited to this. In step S1106 in the flowchart, based on the document size detection result acquired in step S1105, the CPU 0503 may determine whether the detected document size is a standard size of which the size cannot be correctly determined. In this case, if the CPU 0503 determines that the detected document size is a standard size of which the size cannot be correctly determined, the processing proceeds to step S1107. If the CPU 0503 determines that the detected document size is not a standard size of which the size cannot be correctly determined, the processing proceeds to step S1108.

In a fourth exemplary embodiment, an example is described where, in addition to the specifying of a size on a reading size specifying screen based on the document detection capability of the automatic document feeding device, a document size is received, thereby preventing the generation of an unintended resulting product.

Figure 8:
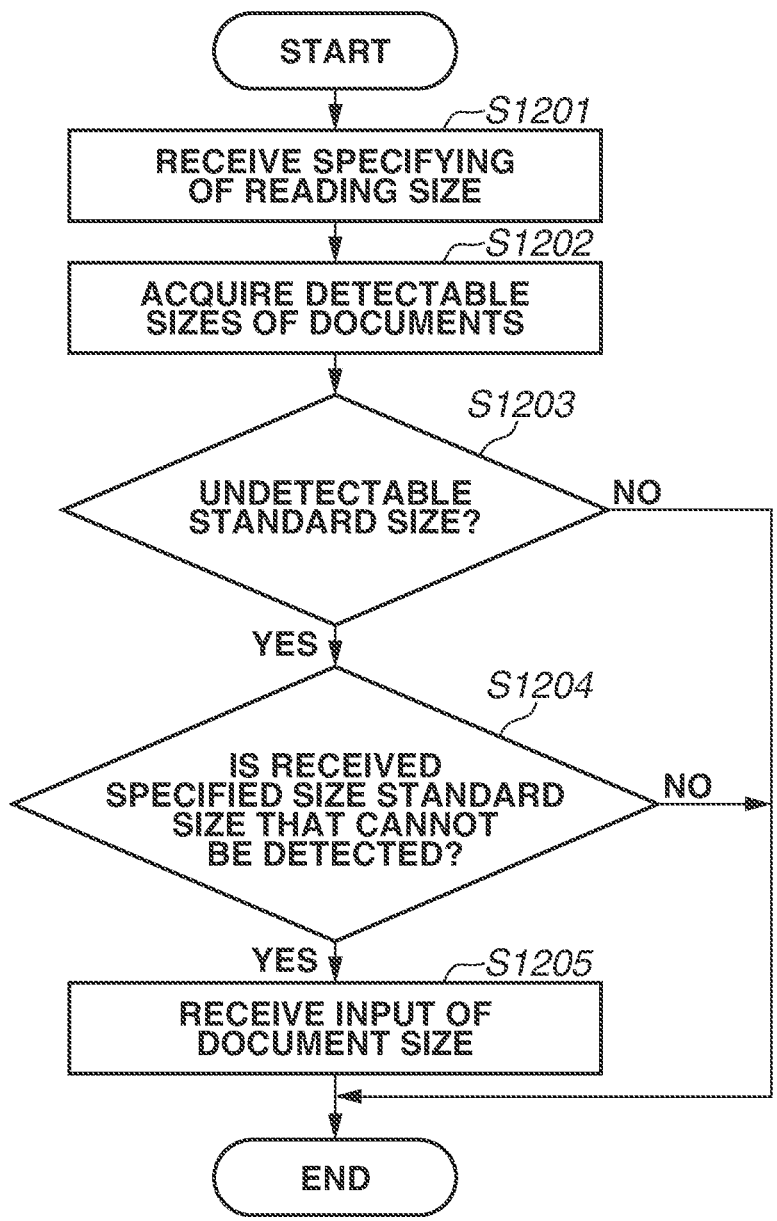
FIG. 8 is a flowchart illustrating a display control procedure of a screen for receiving an input of a document size according to an exemplary embodiment.

Next, with reference to a flowchart in FIG. 8, a description is given of a method for, depending on sizes that can be detected by the automatic document feeding device, receiving the input of a document size. Steps illustrated in the flowchart in FIG. 8 are implemented by the CPU 0503 loading a program stored in the ROM 0505 into the RAM 0504 and executing the program.

The configuration of the image processing apparatus and the hardware configuration of the automatic document feeding device are similar to those in the first exemplary embodiment, and thus are not described here.

Figure 9:
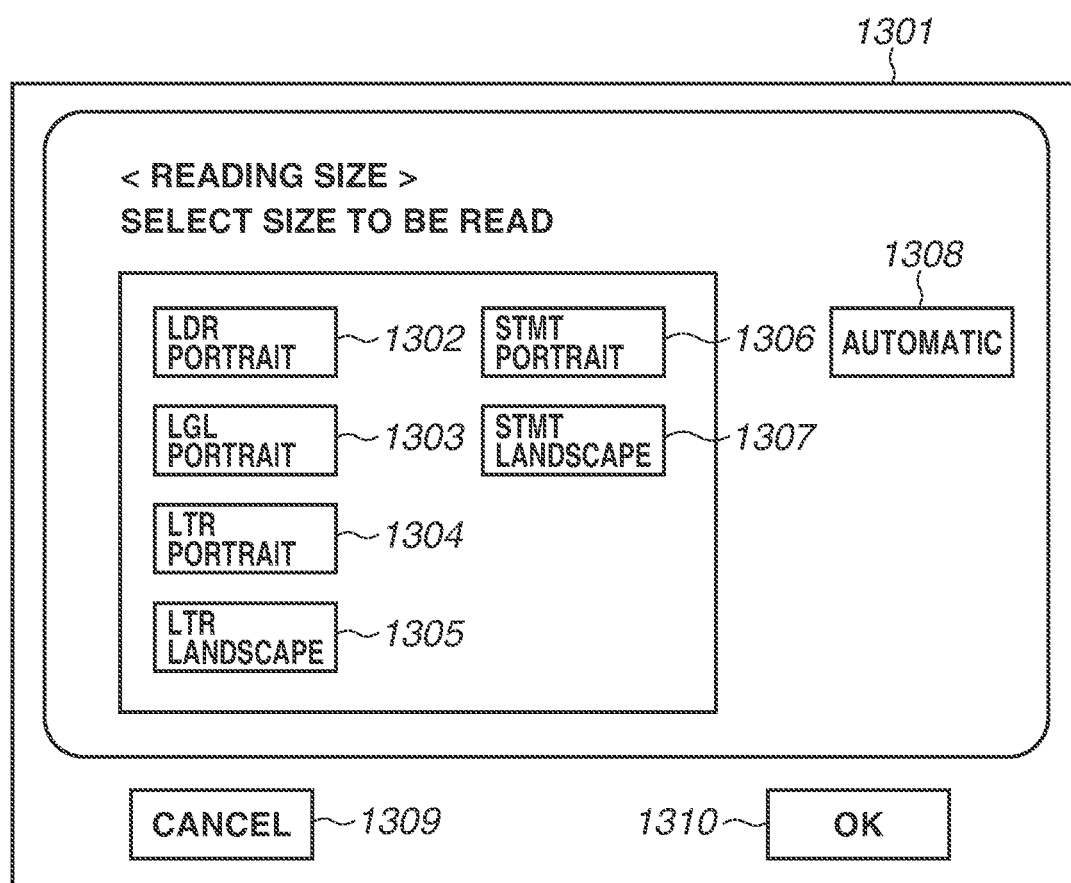
FIG. 9 is a diagram illustrating an example of a screen for receiving a reading size setting according to the exemplary embodiment.

In step S1201, the CPU 0503 receives the specifying of a reading size through the operation unit 0513. FIG. 9 is an example a reading size setting screen for receiving the specifying of the reading size in step S1201. On a screen 1301, buttons 1302 and 1307 for specifying the reading size of a document are arranged, and the specifying including the size and the orientation can be performed. A button 1308 is a button for giving an instruction to perform reading with a size detected by the document size detection sensors 0603, 0613, and 0614. Additionally, a cancel button 1309 for cancelling the setting and an OK button 1310 for finalizing the setting are arranged. If the OK button 1310 is selected in a state where any of the buttons 1302, 1303, 1304, 1305, 1306, or 1307 is selected, the CPU 0503 stores the reading size corresponding to the selected button in the RAM 0504.

In step S1202, the CPU 0503 acquires sizes of documents detectable by the automatic document feeding device of the scanner 0512.

In step S1203, based on the detectable sizes of documents acquired in step S1202, the CPU 0503 determines whether there is a standard size of which the orientation cannot be detected. In a case where the detectable sizes of documents are as illustrated in table 1, the STMT size in the portrait orientation and the STMT size in the landscape orientation are different in the document size and the placement orientation, but obtain the same document size detection results, i.e., the STMT size in the landscape orientation. in other word, the image processing apparatus 0501 cannot detect the STMT size in the portrait orientation. This is because if a document in the STMT size in the portrait orientation is set, the document is detected as the document in the STMT size in the landscape orientation. Thus, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S1203), the processing proceeds to step S1204. On the other hand, if the CPU 0503 determines that there is not a standard size of which the orientation cannot be detected (NO in step S1203), the processing illustrated in FIG. 8 ends. Then, the CPU 0503 instructs the scanner 0512 to convey the document and controls the scanner 0512 to read an image in the reading size received and stored in the RAM 0504 in step S1201.

In step S1204, the CPU 0503 determines whether the specified reading size received in step S1201 is a standard size that cannot be detected by the automatic document feeding device of the scanner 0512. If the CPU 0503 determines that the specified reading size is a standard size that cannot be detected (YES in step S1204), the processing proceeds to step S1205. If the CPU 0503 determines that the specified reading size is not a standard size that cannot be detected (NO in step S1204), the processing illustrated in FIG. 8 ends. Then, the CPU 0503 instructs the scanner 0512 to convey the document and controls the scanner 0512 to read an image in the reading size received and stored in the RAM 0504 in step S1201.

In step S1205, the CPU 0503 displays a document size input screen on the operation unit 0513 and receives a document size.

Figure 10:
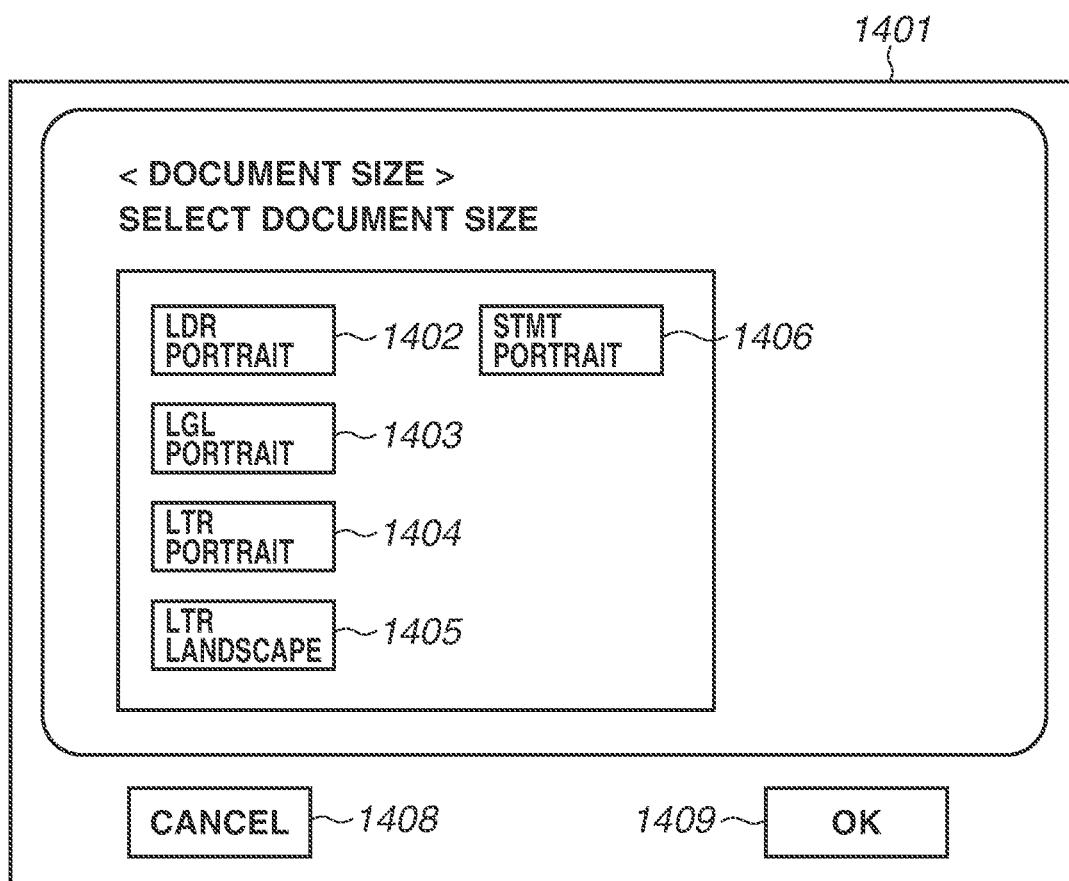
FIG. 10 is a diagram illustrating an example of the screen for receiving the input of the document size according to an exemplary embodiment.

FIG. 10 is an example of the document size input screen in step S1205. On a screen 1401, buttons 1402, 1403, 1404, 1405, and 1406 for selecting the document size are arranged, and the specifying including the size and the orientation can be performed. Additionally, a cancel button 1408 for cancelling the setting and an OK button 1409 for finalizing the setting are arranged. If the OK button 1409 is pressed in a state where any of the buttons 1402 to 1406 is selected, the CPU 0503 stores the document size corresponding to the selected button in the RAM 0504.

Step S1203 is not necessarily required. After the detectable sizes of documents are acquired in step S1202, the processing may proceed to step S1204.

Figure 11:
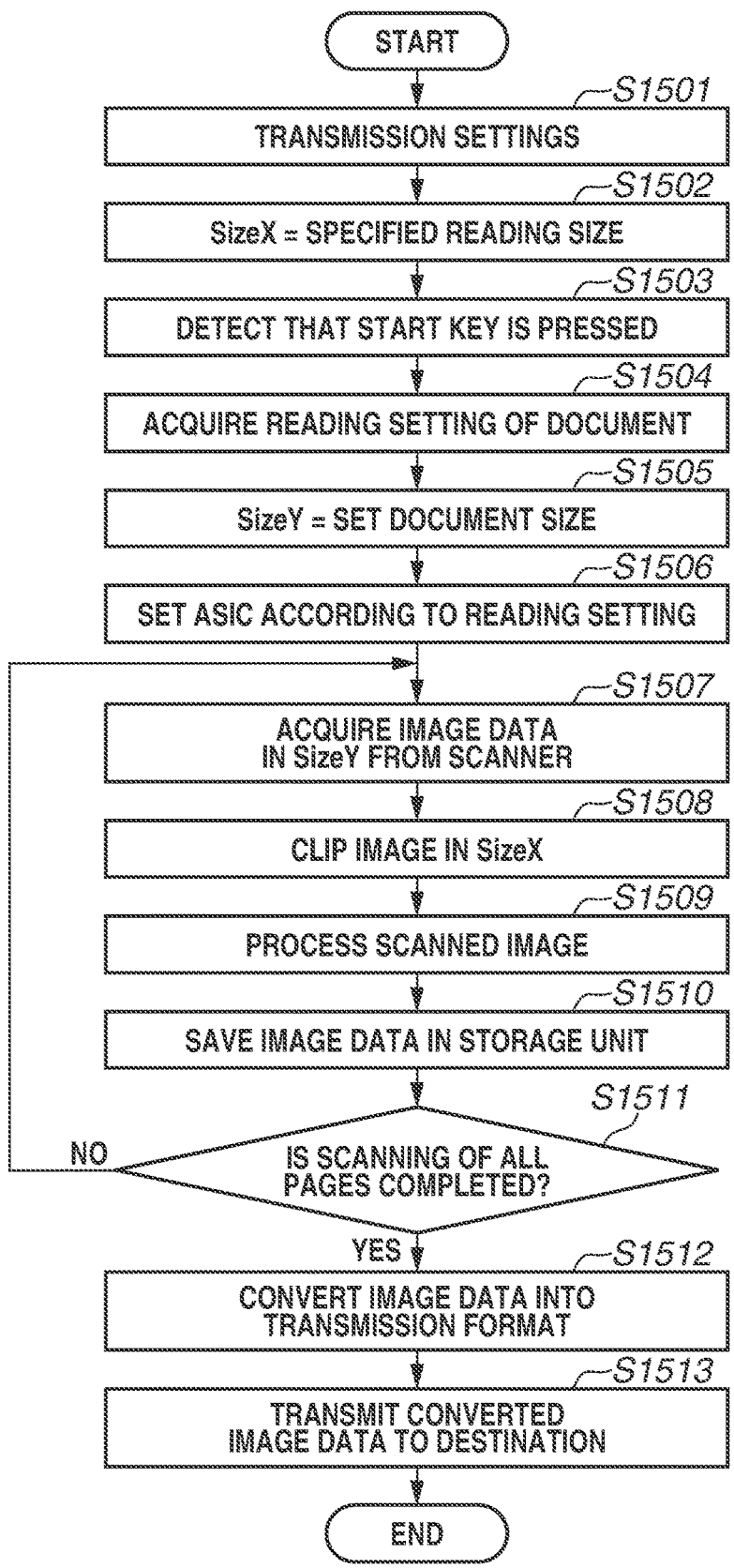
FIG. 11 is a flowchart illustrating a control procedure for transmitting image data of a document according to the exemplary embodiment.

Next, with reference to FIG. 11, a description is given of the processing of the function of converting image data acquired by scanning a document into a Portable Document Format (PDF) file and transmitting the PDF file to a personal computer (PC) (not illustrated) connected to the network 0515. The processing of a flowchart in FIG. 11 is started in response to the pressing of the start key of the operation unit 0513 in a state where the inputs of both a reading size and a document size are received in the flowchart in FIG. 8. This description is given using as an example a case where a document in the STMT size is placed in the landscape orientation on the automatic document feeding device, and the reading size is specified as the STMT size in the landscape orientation, and the document size is also the STMT size in the landscape orientation. Steps illustrated in the flowchart in FIG. 11 are implemented by the CPU 0503 loading a program stored in the ROM 0505 into the RAM 0504 and executing the program.

Figure 12:
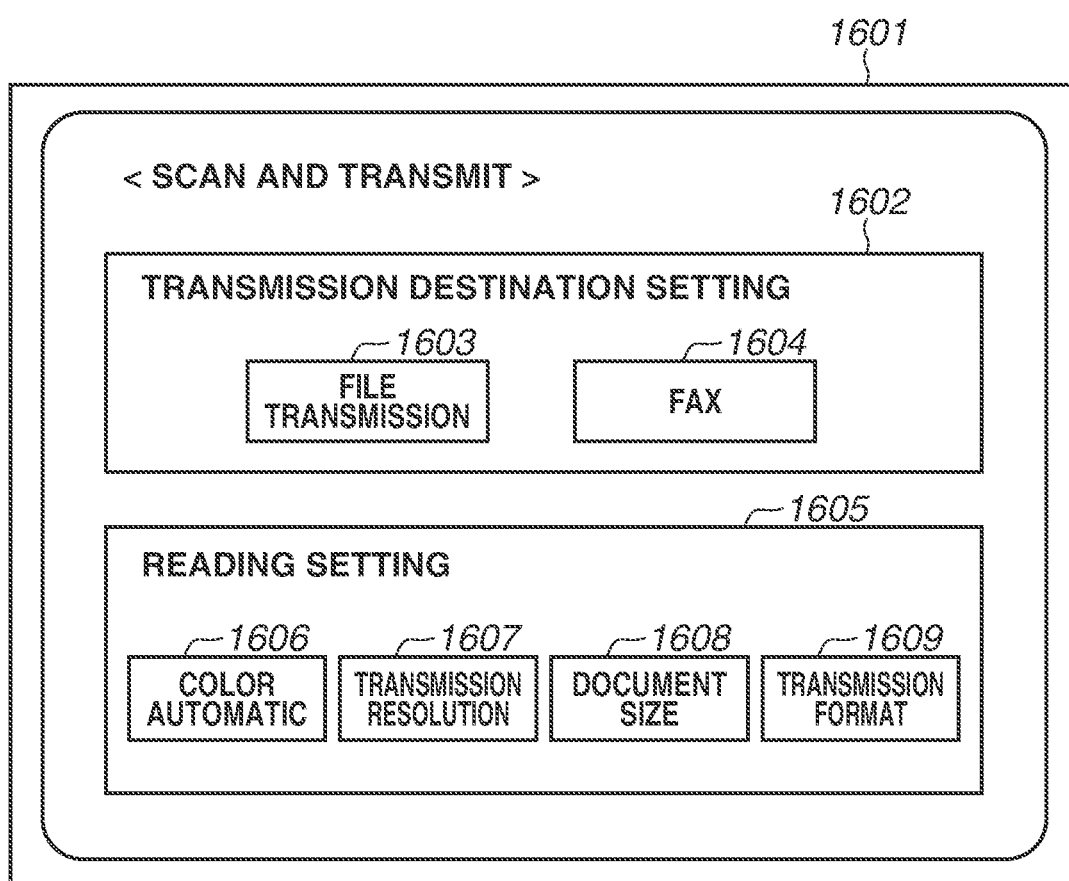
FIG. 12 is a diagram illustrating an example of a "scan and transmit" screen according to the exemplary embodiment.

In step S1501, the CPU 0503 displays on the operation unit 0513 a screen 1601 for making transmission settings illustrated in FIG. 12. Then, the CPU 0503 receives a transmission destination and a reading setting of the document from the user.

The transmission setting screen 1601 is composed of a transmission destination setting 1602 in which buttons for setting the transmission destination are arranged, and a reading setting 1605 in which buttons for making the reading setting of the document are arranged. In the transmission destination setting 1602, a button 1603 for setting the PC connected to the network 0515 as a destination, and a button 1604 for setting a fax transmission destination are arranged. In the reading setting 1605, a button 1606 for setting color reading of the document, a button 1607 for setting a transmission resolution, a button 1608 for specifying the reading size of the document, and a button 1609 for setting the format of a transmission image are arranged. The various settings received in step S1501 are stored in the RAM 0504. If the CPU 0503 detects that the button 1608 for specifying the reading size of the document is pressed, the CPU 0503 displays the screen 1301 described in FIG. 9, on the operation unit 0513.

Next, in step S1502, the CPU 0503 stores the value of the reading size specified on the screen 1301 as a variable SizeX in the RAM 0504.

If all the transmission settings are completed, and the CPU 0503 detects in step S1503 that the start key is pressed through the operation unit 0513, the processing proceeds to step S1504.

In step S1504, the CPU 0503 acquires the reading setting of the document among the settings received in step S1501.

In step S1505, the CPU 0503 stores the document size specified in step S1501 as a variable SizeY in the RAM 0504.

In step S1506, depending on the reading setting acquired in step S1504, the CPU 0503 determines an application-specific integrated circuit (ASIC) for use in executing scanning and sets the ASIC.

In step S1507, the CPU 0503 causes the scanner 0512 to scan the document and acquires image data in the size set to the variable SizeY.

In step S1508, with reference to a memory position corresponding to the upper right of the document, the CPU 0503 clips an image in the size set to the variable SizeX from the image data in the size set to the variable SizeY acquired in step S1507.

In step S1509, the CPU 0503 and the image processing unit 0507 execute image processing on the received image data.

In step S1510, the CPU 0503 stores the image data subjected to the image processing in the storage unit 0506.

In step S1511, the CPU 0503 determines whether the scanning process on all the pages is completed. If the CPU 0503 determines that the scanning process on all the pages is not completed (NO in step S1511), the processing returns to step S1507. In step S1507, the CPU 0503 executes the scanning process on the next page. If the CPU 0503 determines that the scanning process on all the pages is completed (YES in step S1511), the processing proceeds to step S1512. In step S1512, the CPU 0503 and the image processing unit 0507 convert the image data stored in step S1510 into data in the transmission format designated by using the button 1609 received in step S1501.

In step S1513, the CPU 0503 executes a transmission process for transmitting the converted image data to the destination set in step S1501, and the processing ends.

In the case of the automatic document feeding device having the document detection capability described with reference to the table 1, if a document in the STMT size is placed in the landscape orientation, the automatic document feeding device incorrectly determines the document as a document in the STMT size in the portrait orientation and extracts an image in the STMT size in the landscape orientation with reference to the STMT size in the portrait orientation. However, a document size is also received as in the flowchart described in FIG. 8, whereby the image in the STMT size in the landscape orientation is extracted with reference to the STMT size in the landscape orientation. Thus, it is possible to normally generate the image in the STMT size in the landscape orientation.

As described above, in addition to the specifying of a size on a reading size specifying screen based on the document detection capability of the automatic document feeding device, a document size is received, whereby it is possible to prevent the generation of an unintended resulting product.

In the fourth exemplary embodiment, the description has been given of the method for, based on the document detection capability of the automatic document feeding device, also receiving a document size. However, in addition to reading a document using the automatic document feeding device, the scanner 0512 can also read a document placed on a document platen using the sensor unit 0611. If a document is placed on the document platen, the document can be read regardless of the document detection capability of the automatic document feeding device. However, with the method according to the fourth exemplary embodiment, it takes trouble to input the document size even in the case of the document platen.

In a fifth exemplary embodiment, a description is given of a method for, further depending on whether a document is placed on the automatic document feeding device, receiving a document size.

Figure 13:
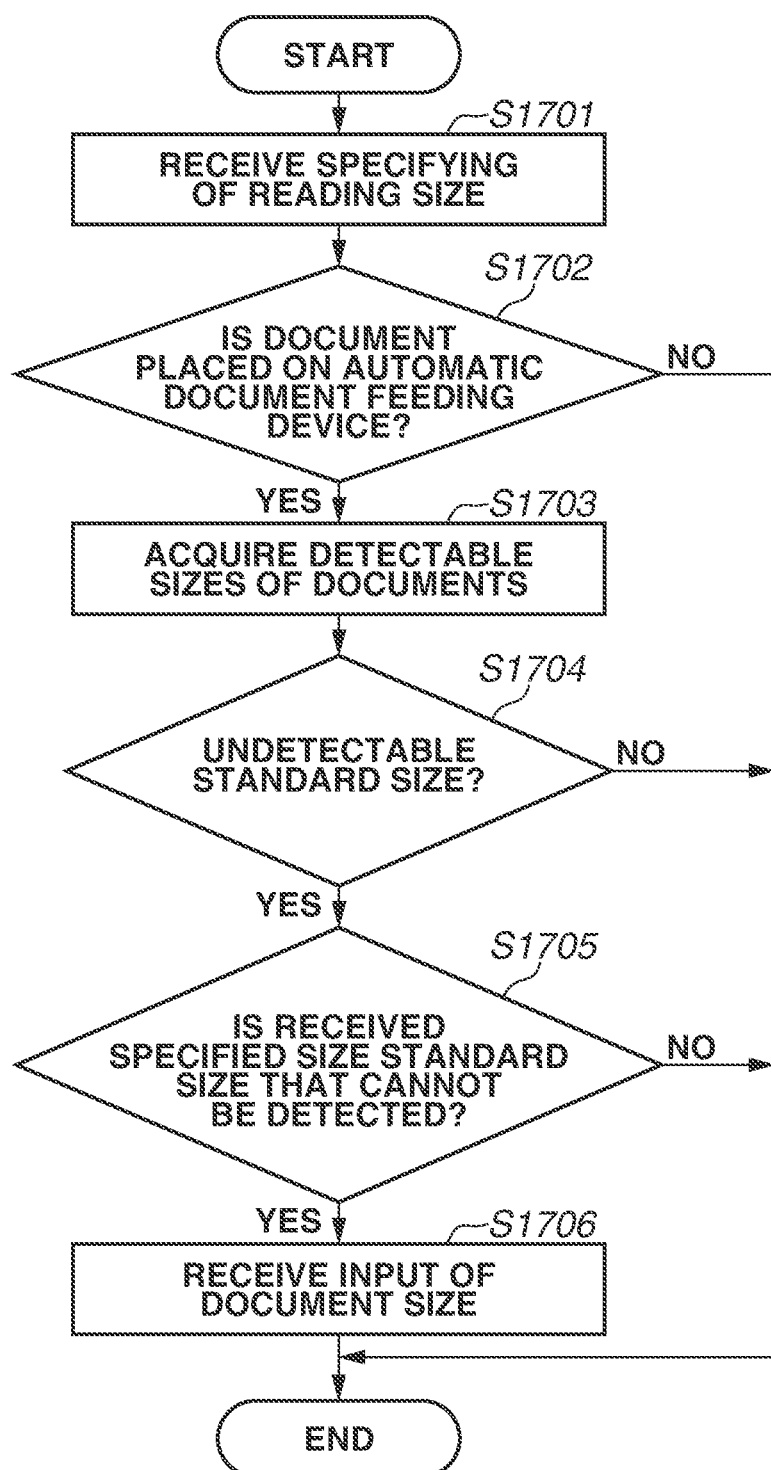
FIG. 13 is a flowchart illustrating a display control procedure of a screen for receiving an input of a document size according to an exemplary embodiment.

Next, with reference to a flowchart in FIG. 13, a description is given of a method for, depending on sizes detectable by the automatic document feeding device and whether a document is placed on the automatic document feeding device, receiving the input of a document size. Steps illustrated in the flowchart in FIG. 13 are implemented by the CPU 0503 loading a program stored in the ROM 0505 into the RAM 0504 and executing the program.

In step S1701, the CPU 0503 confirms that a reading size specifying button for displaying a screen for setting a reading size is pressed on the operation unit 0513.

In step S1702, based on the presence or absence of a signal from the document sensor 0602, the CPU 0503 determines whether a document is placed on the automatic document feeding device. If the CPU 0503 receives from the document sensor 0602 a signal indicating that a document is set, the CPU 0503 determines that a document is placed on the automatic document feeding device (YES in step S1702), and the processing proceeds to step S1703. If the CPU 0503 does not receive from the document sensor 0602 the signal indicating that a document is set, the CPU 0503 determines that a document is not placed on the automatic document feeding device (NO in step S1702), and the processing illustrated in the flowchart in FIG. 13 ends. Instead of determining whether a document is not placed on the automatic document feeding device, if the document detection sensor for detecting a document placed on the document platen determines that a document is placed on the document platen, the processing illustrated in the flowchart in FIG. 13 may end.

In step S1703, the CPU 0503 acquires sizes of documents detectable by the automatic document feeding device of the scanner 0512.

In step S1704, based on the detectable sizes of documents acquired in step S1703, the CPU 0503 determines whether there is a standard size of which the orientation cannot be detected. In a case where the detectable sizes of documents are as illustrated in the table 1, the STMT size in the portrait orientation and the STMT size in the landscape orientation are different in the document size and the orientation, but obtain the same document size detection results, i.e., the STMT size in the landscape orientation. Thus, the image processing apparatus 0501 cannot detect the STMT size in the portrait orientation. This is because if a document in the STMT size in the portrait orientation is set, the document is detected as the document in the STMT size in the landscape orientation. Thus, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S1704), the processing proceeds to step S1705. On the other hand, if the CPU 0503 determines that there is not a standard size of which the orientation cannot be detected (NO in step S1704), the processing illustrated in the flowchart in FIG. 13 ends. Then, the CPU 0503 instructs the scanner 0512 to convey the document and controls the scanner 0512 to read an image in the reading size received and stored in the RAM 0504 in step S1701.

In step S1705, the CPU 0503 determines whether the specified reading size received in step S1701 is a standard size that cannot be detected by the automatic document feeding device of the scanner 0512. If the CPU 0503 determines that the specified reading size is a standard size of which the orientation cannot be detected (YES in step S1705), the processing proceeds to step S1706. If the CPU 0503 determines that the specified reading size is not a standard size of which the orientation cannot be detected (NO in step S1705), the processing illustrated in FIG. 13 ends. Then, the CPU 0503 instructs the scanner 0512 to convey the document and controls the scanner 0512 to read an image in the reading size received and stored in the RAM 0504 in step S1701.

In step S1706, the CPU 0503 displays a document size input screen on the operation unit 0513 and receives a document size.

FIG. 10 is an example of the document size input screen in step S1706. On a screen 1401, buttons 1402 to 1406 for selecting the document size are arranged, and the specifying including the size and the orientation can be performed. Additionally, a cancel button 1408 for cancelling the setting and an OK button 1409 for finalizing the setting are arranged. If the OK button 1409 is pressed in a state where any of the buttons 1402 to 1406 is selected, the CPU 0503 stores the document size corresponding to the selected button in the RAM 0504.

As described above, in a case where a document is placed on the automatic document feeding device, in addition to the specifying of a size on a reading size specifying screen based on the document detection capability of the automatic document feeding device, a document size is received, whereby it is possible to prevent the generation of an unintended resulting product.

Steps S1703 and S1704 are not necessarily required. If the CPU 0503 determines in step S1702 that a document is placed on the automatic document feeding device, the processing may proceed to step S1705.

In the fifth exemplary embodiment, the description has been given of the method for, based on the document detection capability of the automatic document feeding device and whether a document is placed on the automatic document feeding device, also receiving a document size.

In a case where the user specifies a reading size, a size specified as the reading size and a document size do not necessarily match each other. In a case where only a part of a document is read, the document size may be larger than the reading size. For example, a case is possible where only an upper portion of a document in the LTR size in the portrait orientation is needed, and thus, the STMT size in the landscape orientation is specified in the specifying of the reading size.

In a sixth exemplary embodiment, a description is given of a method for, further in a case where a document is placed on the automatic document feeding device, receiving a detected size based on the document size detection sensors 0603, 0613, and 0614 and receiving a document size.

Figure 14:
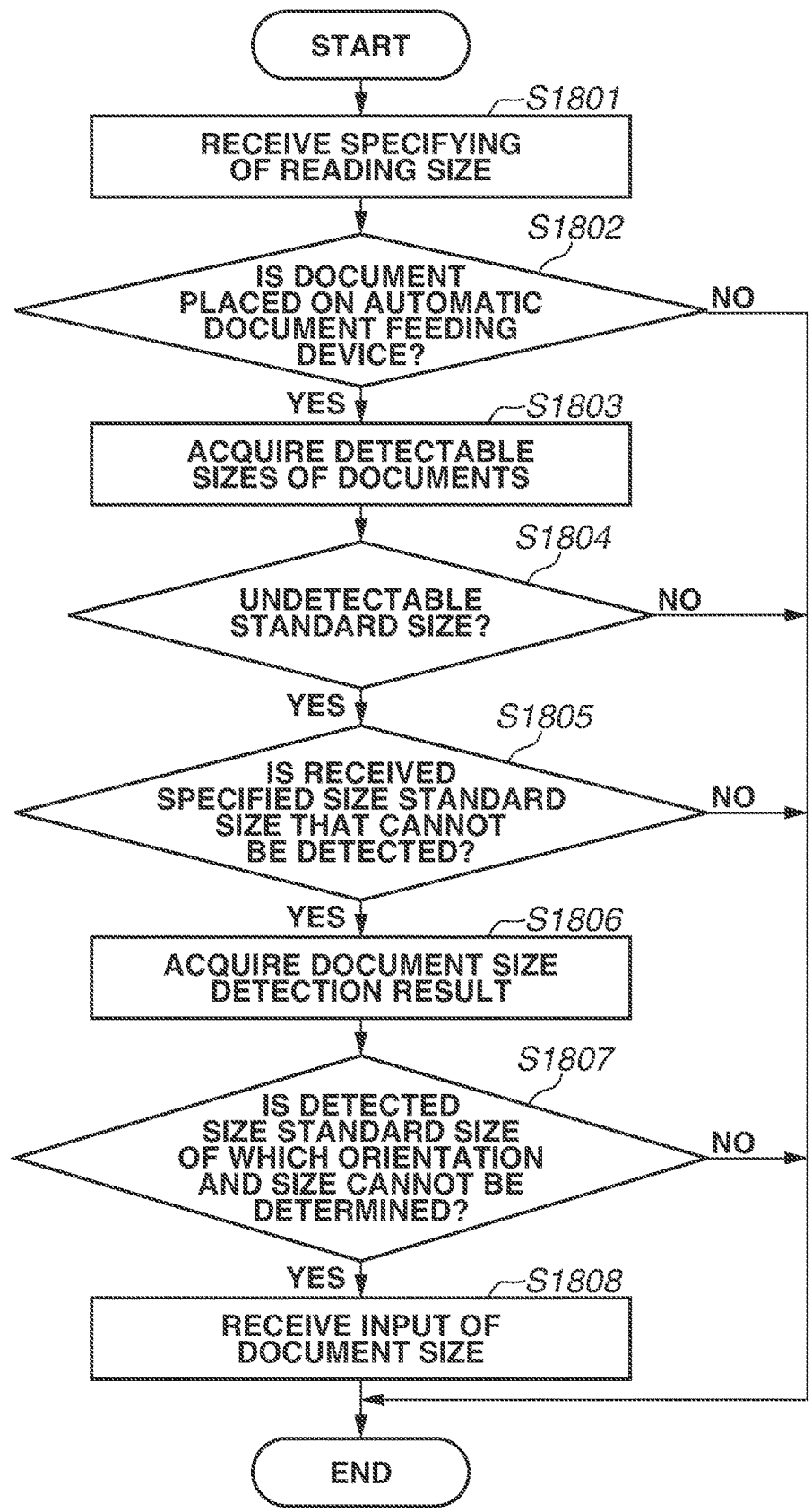
FIG. 14 is a flowchart illustrating a display control procedure of a screen for receiving an input of a document size according to an exemplary embodiment.

Next, with reference to a flowchart in FIG. 14, a description is given of a method for, depending on sizes that can be detected by the automatic document feeding device, whether a document is placed on the automatic document feeding device, and a size detected by the document size detection sensors 0603, 0613, and 0614, receiving the input of a document size. Steps illustrated in the flowchart in FIG. 14 are implemented by the CPU 0503 loading a program stored in the ROM 0505 into the RAM 0504 and executing the program.

In step S1801, the CPU 0503 confirms that a reading size specifying button for displaying a screen for setting a reading size is pressed on the operation unit 0513.

In step S1802, based on the presence or absence of a signal from the document sensor 0602, the CPU 0503 determines whether a document is placed on the automatic document feeding device. If the CPU 0503 receives from the document sensor 0602 a signal indicating that a document is set, the CPU 0503 determines that a document is placed on the automatic document feeding device (YES in step S1802), and the processing proceeds to step S1803. If the CPU 0503 does not receive from the document sensor 0602 the signal indicating that a document is set, the CPU 0503 determines that a document is not placed on the automatic document feeding device (NO in step S1802), and the processing illustrated in the flowchart in FIG. 14 ends. Instead of determining whether a document is not placed on the automatic document feeding device, if the document detection sensor for detecting a document placed on the document platen determines that a document is placed on the document platen, the processing illustrated in the flowchart in FIG. 14 may end.

In step S1803, the CPU 0503 acquires sizes of documents detectable by the automatic document feeding device of the scanner 0512.

In step S1804, based on the detectable sizes of documents acquired in step S1803, the CPU 0503 determines whether there is a standard size of which the orientation cannot be detected. In a case where the detectable sizes of documents are as illustrated in the table 1, the STMT size in the portrait orientation and the STMT size in the landscape orientation are different in the document size and the placement orientation, but obtain the same document size detection results, i.e., the STMT size in the landscape orientation. In other words, the image processing apparatus 0501 cannot detect the STMT size in the portrait orientation. This is because if a document in the STMT size in the portrait orientation is set, the document is detected as the document in the STMT size in the landscape orientation. Thus, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S1804), the processing proceeds to step S1805. On the other hand, if the CPU 0503 determines that there is not a standard size of which the orientation cannot be detected (NO in step S1804), the processing illustrated in the flowchart in FIG. 14 ends. Then, the CPU 0503 instructs the scanner 0512 to convey the document and controls the scanner 0512 to read an image in the reading size received and stored in the RAM 0504 in step S1801.

In step S1805, the CPU 0503 determines whether the specified reading size received in step S1801 is a standard size that cannot be detected based on a signal from the document detection sensor of the automatic document feeding device of the scanner 0512. If the CPU 0503 determines that the specified reading size is a standard size that cannot be detected (YES in step S1805), the processing proceeds to step S1806. If the CPU 0503 determines that the specified reading size is not a standard that cannot be detected (NO in step S1805), the processing illustrated in the flowchart in FIG. 14 ends.

In step S1806, the CPU 0503 acquires a document size detection result of the automatic document feeding device of the scanner 0512.

In step S1807, the CPU 0503 determines whether the specified reading size received in step S1801 is a standard size that cannot be detected by the automatic document feeding device of the scanner 0512. If the CPU 0503 determines that the specified reading size is a standard size that cannot be detected (YES in step S1807), the processing proceeds to step S1808. If the CPU 0503 determines that the specified reading size is not a standard size that cannot be detected (NO in step S1807), the processing illustrated in the flowchart in FIG. 14 ends. Then, the CPU 0503 instructs the scanner 0512 to convey the document and controls the scanner 0512 to read an image in the reading size received and stored in the RAM 0504 in step S1801.

In step S1808, the CPU 0503 displays a document size input screen on the operation unit 0513 and receives a document size.

FIG. 10 is an example of the document size input screen in step S1808. On a screen 1401, buttons 1402 to 1406 for selecting the document size are arranged, and the specifying including the size and the orientation can be performed. Additionally, a cancel button 1408 for cancelling the setting and an OK button 1409 for finalizing the setting are arranged. If the OK button 1409 is pressed in a state where any of the buttons 1402 to 1406 is selected, the CPU 0503 stores the document size corresponding to the selected button in the RAM 0504.

As described above, in a case where a document is placed on the automatic document feeding device, a document size detection result of the automatic document feeding device is used. Consequently, in addition to the specifying of a size on a reading size specifying screen based on the document detection capability of the automatic document feeding device, a document size is received, whereby it is possible to prevent the generation of an unintended resulting product.

Steps S1803 and S1804 are not necessarily required. If the CPU 0503 determines in step S1802 that a document is placed on the automatic document feeding device, the processing may proceed to step S1805.

In a seventh exemplary embodiment, a description is given of a method for, by specifying a reading size, displaying a screen for a document placement method, thereby preventing the generation of a resulting product unintended by a user.

Figure 15:
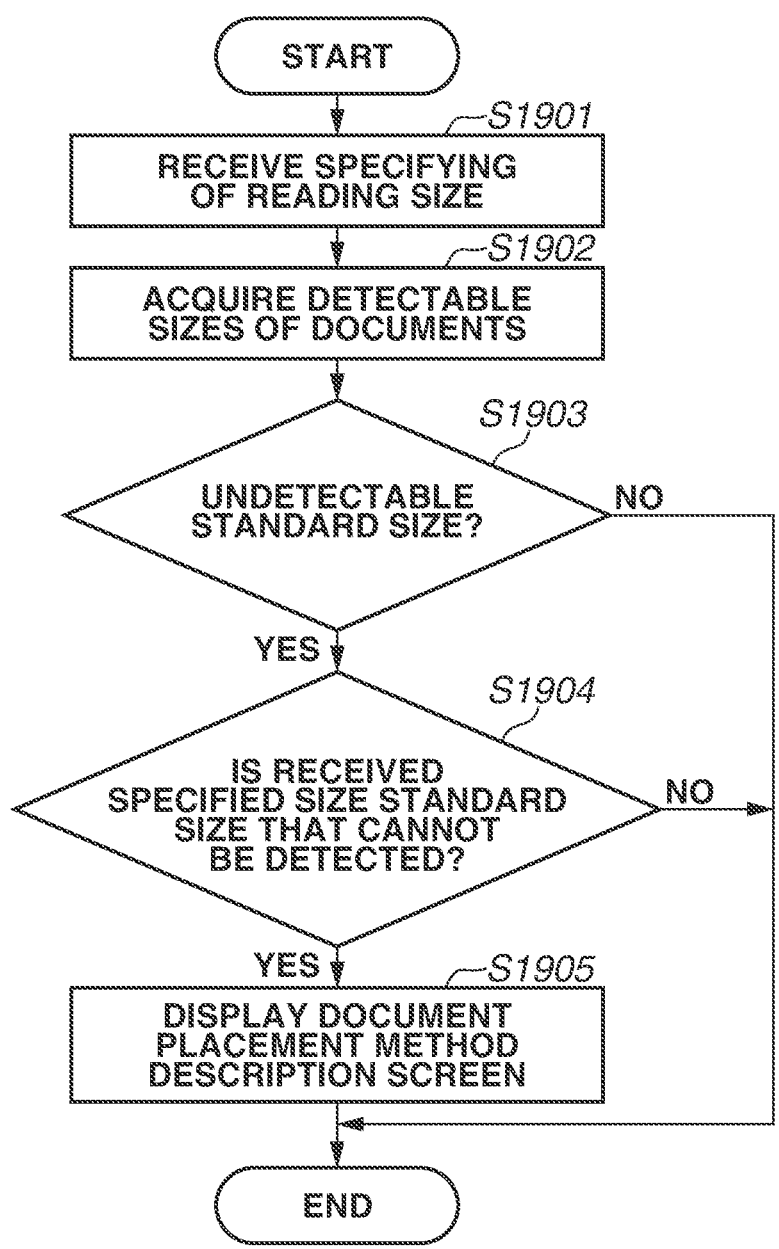
FIG. 15 is a flowchart illustrating a display control procedure of a document placement method description screen according to an exemplary embodiment.

Next, with reference to a flowchart in FIG. 15, a description is given of a method for, depending on sizes that can be detected by the automatic document feeding device and a specified reading size, switching the display of a screen for a document placement method. Steps illustrated in the flowchart in FIG. 15 are implemented by the CPU 0503 loading a program stored in the ROM 0505 into the RAM 0504 and executing the program.

In step S1901, the CPU 0503 receives through the operation unit 0513 the specifying of a reading size for displaying a screen for setting the reading size.

In step S1902, the CPU 0503 acquires sizes of documents detectable by the automatic document feeding device of the scanner 0512.

In step S1903, based on the detectable sizes of documents acquired in step S1902, the CPU 0503 determines whether there is a standard size of which the orientation cannot be detected. In a case where the detectable sizes of documents are as illustrated in the table 1, the STMT size in the portrait orientation and the STMT size in the landscape orientation are different in the document size and the placement orientation, but obtain the same document size detection results, i.e., the STMT size in the landscape orientation. In other word, the image processing apparatus 0501 cannot detect the STMT size in the portrait orientation. This is because if a document in the STMT size in the portrait orientation is set, the document is detected as the document in the STMT size in the landscape orientation. Thus, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S1903), the processing proceeds to step S1904. On the other hand, if the CPU 0503 determines that there is not a standard size of which the orientation cannot be detected (NO in step S1903), the processing illustrated in the flowchart in FIG. 15 ends. Then, the CPU 0503 instructs the scanner 0512 to convey the document and controls the scanner 0512 to read an image in the reading size received and stored in the RAM 0504 in step S1901.

In step S1904, the CPU 0503 determines whether the specified reading size received in step S1901 is a standard size that cannot be detected by the document detection sensor of the automatic document feeding device of the scanner 0512. If the CPU 0503 determines that the specified reading size is a standard size that cannot be detected (YES in step S1904), the processing proceeds to step S1905. If the CPU 0503 determines that the specified reading size is not a standard size that cannot be detected (NO in step S1904), the processing illustrated in FIG. 15 ends. Then, the CPU 0503 instructs the scanner 0512 to convey the document and controls the scanner 0512 to read an image in the reading size received and stored in the RAM 0504 in step S1901.

In step S1905, the CPU 0503 displays a document placement method description screen on the operation unit 0513.

Step S1903 is not necessarily required. After the detectable sizes of documents are acquired in step S1902, the processing may proceed to step S1904.

Figure 16:
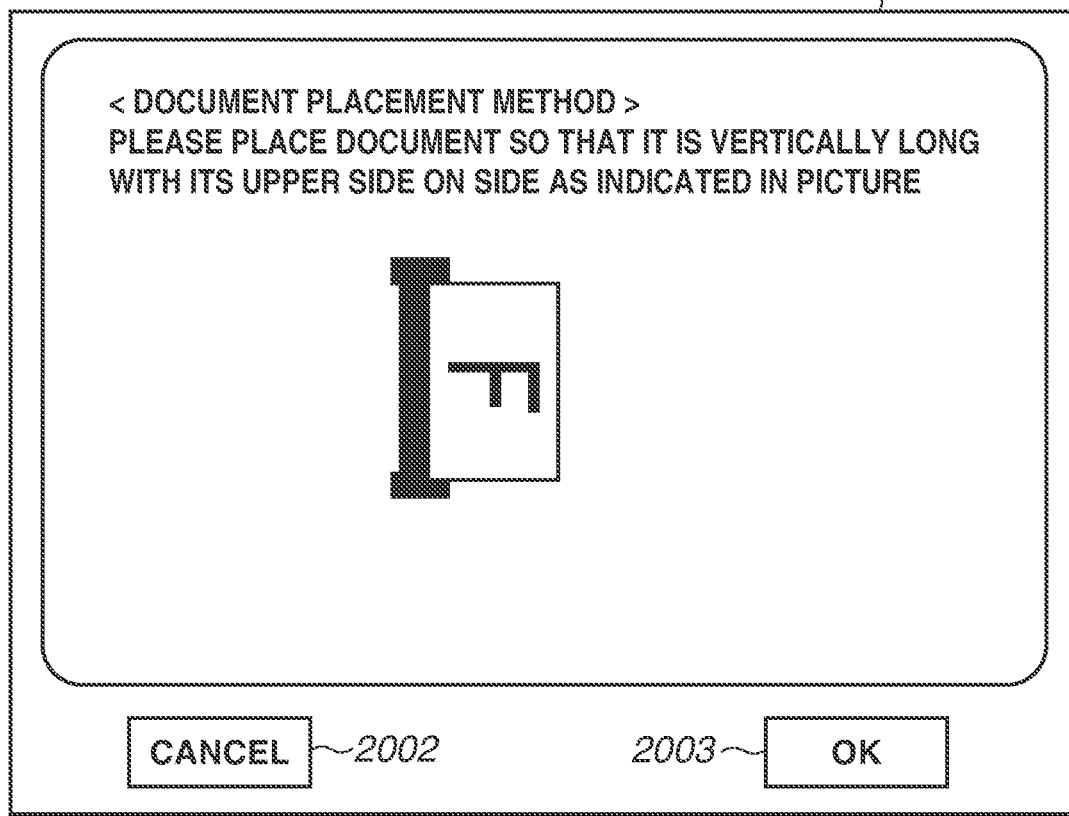
FIG. 16 is a flowchart illustrating the document placement method description screen according to the exemplary embodiment.

FIG. 16 is an example of the display of the document placement method description screen. As illustrated in a screen 2001, the CPU 0503 notifies the user of what orientation the upper side of the document should be placed in. Additionally, a cancel button 2002 for cancelling the setting of the reading size received in step S1901 and an OK button 2003 for finalizing the setting of the reading size received in step S1901 are arranged.

In the case of the automatic document feeding device having the document detection capability described in the table 1, the automatic document feeding device cannot distinguish whether a document in the STMT size is in the portrait orientation or the landscape orientation. Thus, it is determined that the document is in the STMT size in the portrait orientation. On the other hand, if the STMT size in the landscape orientation is specified in the specifying of the reading size, it is highly likely that the document is also in the STMT size in the portrait orientation. Thus, the user is requested to place the document in the STMT size in the portrait orientation as described in FIG. 16, and image data is rotated in the image processing apparatus 0501, whereby it is possible to normally generate an image in the STMT size in the landscape orientation.

Figure 17:
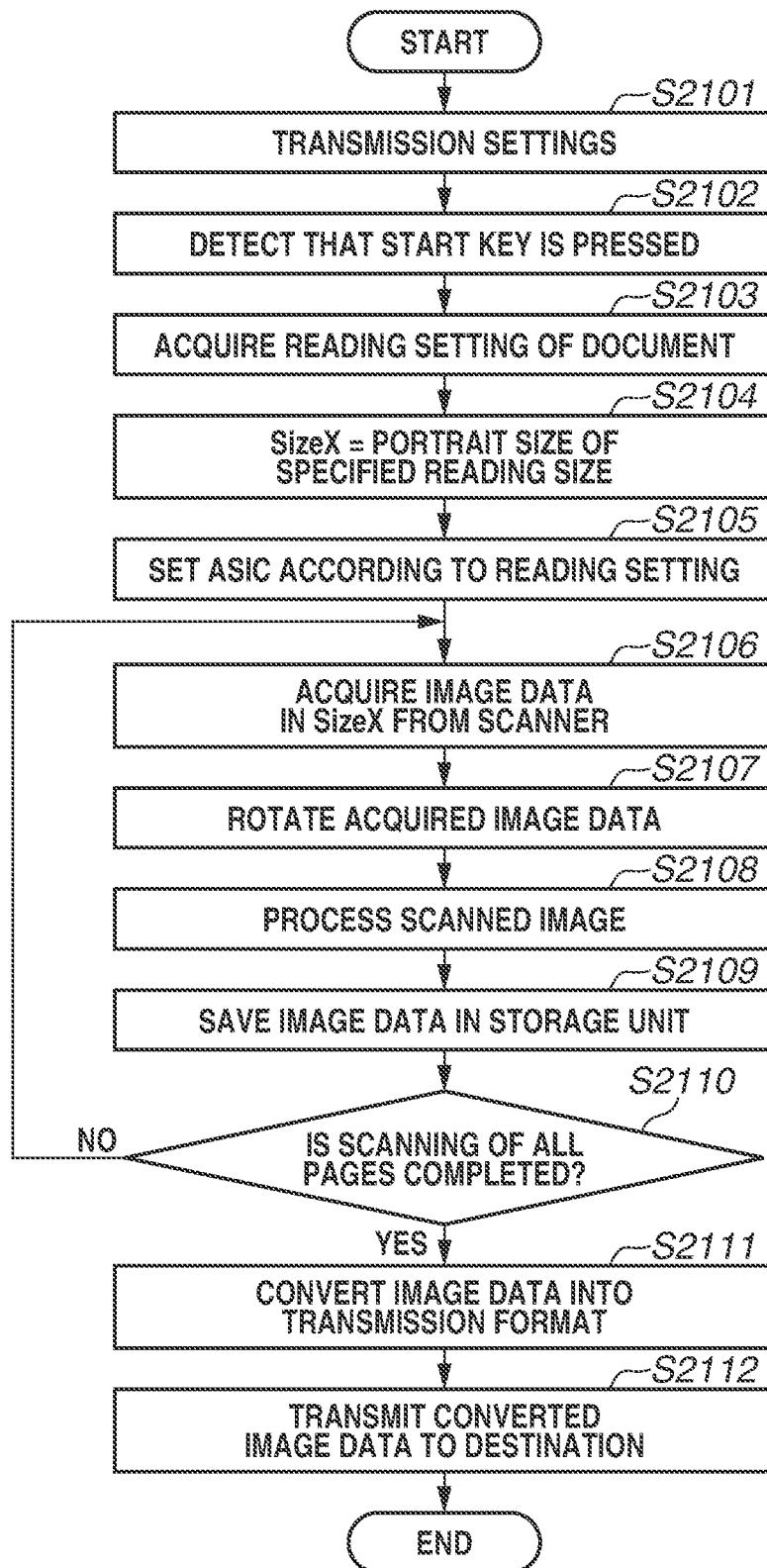
FIG. 17 is a flowchart illustrating a control procedure for transmitting image data of a document according to the exemplary embodiment.

Next, with reference to FIG. 17, using as an example of the function of converting image data acquired by scanning a document into a PDF file and transmitting the PDF file to the PC (not illustrated) connected to the network 0515, a description is given of the procedure of a scanning process in a case where the user is requested to place the document in the portrait orientation using the document placement method description screen in FIG. 16. Steps illustrated in the flowchart in FIG. 17 are implemented by the CPU 0503 loading a program stored in the ROM 0505 into the RAM 0504 and executing the program.

In step S2101, the CPU 0503 displays on the operation unit 0513 the screen 1601 for making transmission settings that is illustrated in FIG. 12. Then, the CPU 0503 receives transmission settings such as a transmission destination and a reading setting of the document.

If the reception of the transmission settings is completed, and the CPU 0503 detects in step S2102 that the start key is pressed through the operation unit 0513, the processing proceeds to step S2103.

In step S2103, the CPU 0503 acquires the reading setting of the document among the transmission settings in step S2101.

In step S2104, the CPU 0503 stores the portrait size of the reading size specified in step S2101 as a variable SizeX in the RAM 0504.

In step S2105, depending on the reading setting acquired in step S2103, the CPU 0503 determines an ASIC for use in executing scanning and sets the ASIC.

In step S2106, the CPU 0503 causes the scanner 0512 to scan the document and acquires image data in the size set to the variable SizeX.

In step S2107, the CPU 0503 rotates the image data in the size set to the variable SizeX acquired in step S2106.

In step S2108, the CPU 0503 and the image processing unit 0507 execute image processing on the received image data.

In step S2109, the CPU 0503 stores the image data in the storage unit 0506.

In step S2110, the CPU 0503 determines whether the scanning of all the pages is completed. If the CPU 0503 determines that the scanning of all the pages is not completed (NO in step S2110), the processing returns to step S2106. In step S2106, the CPU 0503 executes the scanning of the next page. If the CPU 0503 determines that the scanning of all the pages is completed (YES in step S2110), the processing proceeds to step S2111. In step S2111, the CPU 0503 and the image processing unit 0507 convert the image data saved in step S2109 based the setting of the transmission format designated by using the button 1609 in step S2101.

In step S2112, the CPU 0503 executes a transmission process for transmitting the converted image data to the destination set in step S1501, and the processing ends.

In the case of the automatic document feeding device having the document detection capability described in the table 1, if a document in the STMT size is placed in the landscape orientation, the automatic document feeding device incorrectly determines the document as a document in the STMT size in the portrait orientation and extracts an image in the STMT size in the landscape orientation with reference to the STMT size in the portrait orientation. However, the user is requested to place the document in the STMT size in the landscape orientation in the STMT size in the portrait orientation on the automatic document feeding device, and read image data is rotated, whereby it is possible to normally generate an image in the STMT size in the landscape orientation.

As described above, depending on the specifying of a reading size based on the document detection capability of the automatic document feeding device, a screen for a document placement method is displayed, whereby it is possible to prevent the generation of a resulting product unintended by the user.

In the seventh exemplary embodiment, the description has been given of the method for displaying a document placement method based on the document detection capability of the automatic document feeding device.

In an eighth exemplary embodiment, a description is given of an example where, further taking into consideration whether a document is placed on the automatic document feeding device, the setting of whether to display a document placement method is changed.

Figure 18:
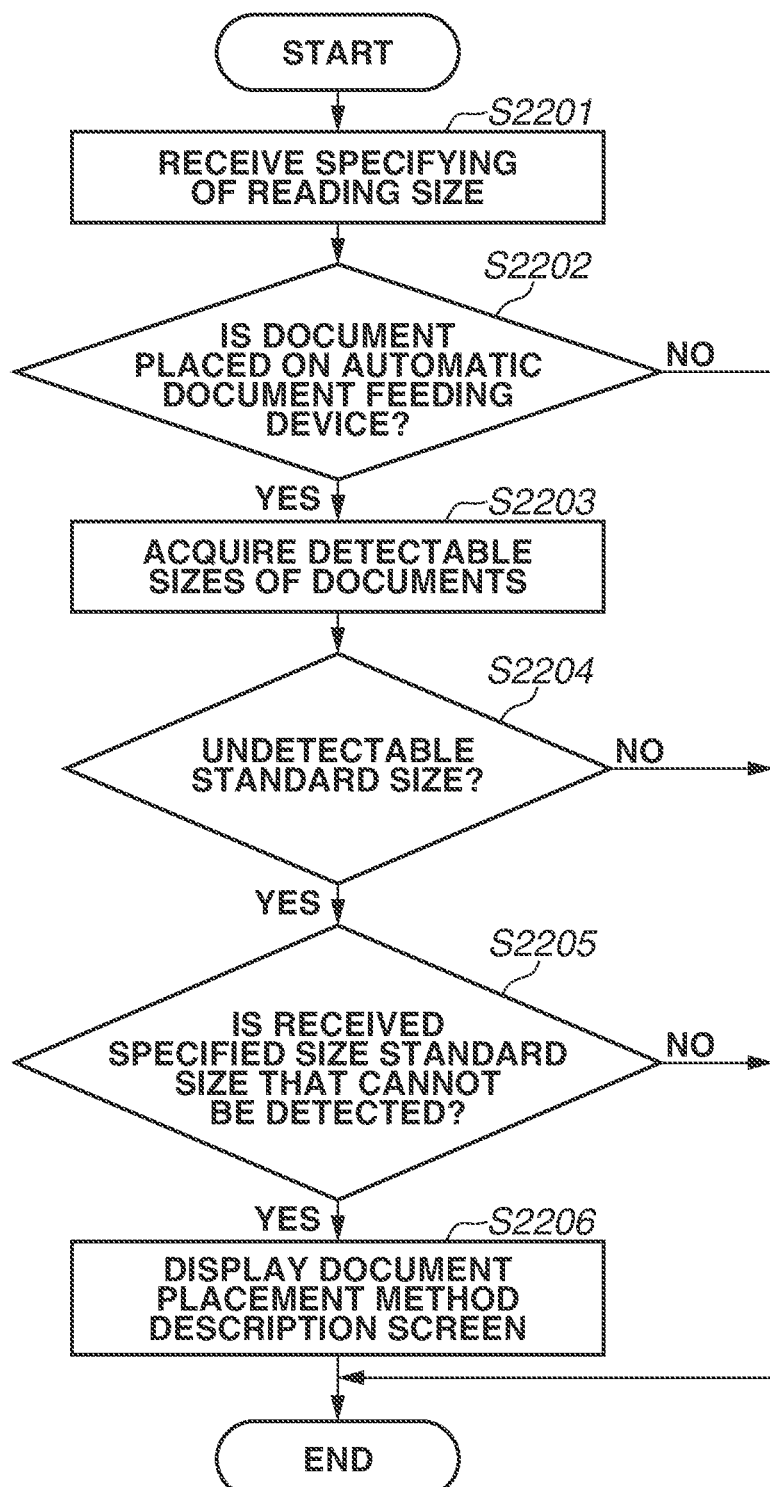
FIG. 18 is a flowchart illustrating a document placement method description screen according to an exemplary embodiment.

Next, with reference to a flowchart in FIG. 18, the description is given of a method for, depending on sizes that can be detected by the automatic document feeding device and whether a document is placed on the automatic document feeding device, receiving the input of a document size. Steps illustrated in the flowchart in FIG. 18 are implemented by the CPU 0503 loading a program stored in the ROM 0505 into the RAM 0504 and executing the program.

In step S2201, the CPU 0503 confirms that a reading size specifying button for displaying a screen for setting a reading size is pressed on the operation unit 0513.

In step S2202, based on the presence or absence of a signal from the document sensor 0602, the CPU 0503 determines whether a document is placed on the automatic document feeding device. If the CPU 0503 receives from the document sensor 0602 a signal indicating that a document is set, the CPU 0503 determines that a document is placed on the automatic document feeding device (YES in step S2202), and the processing proceeds to step S2203. If the CPU 0503 does not receive from the document sensor 0602 the signal indicating that a document is set, the CPU 0503 determines that a document is not placed on the automatic document feeding device (NO in step S2202), and the processing illustrated in the flowchart in FIG. 18 ends. Instead of determining whether a document is placed on the automatic document feeding device, if the document detection sensor for detecting a document placed on the document platen determines that a document is placed on the document platen, the processing illustrated in the flowchart in FIG. 18 may end.

In step S2203, the CPU 0503 acquires sizes of documents detectable by the automatic document feeding device of the scanner 0512.

In step S2204, based on the detectable sizes of documents acquired in step S2203, the CPU 0503 determines whether there is a standard size of which the orientation cannot be detected. In a case where the detectable sizes of documents are as illustrated in the table 1, the STMT size in the portrait orientation and the STMT size in the landscape orientation are different in the document size and the placement orientation, but obtain the same document size detection results, i.e., the STMT size in the landscape orientation. In other word, the image processing apparatus 0501 cannot detect the STMT size in the portrait orientation. This is because if a document in the STMT size in the portrait orientation is set, the document is detected as the document in the STMT size in the landscape orientation. Thus, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S2204), the processing proceeds to step S2205. On the other hand, if the CPU 0503 determines that there is not a standard size of which the orientation cannot be detected (NO in step S2204), the processing illustrated in the flowchart in FIG. 18 ends. Then, the CPU 0503 instructs the scanner 0512 to convey the document and controls the scanner 0512 to read an image in the reading size received and stored in the RAM 0504 in step S2201.

In step S2205, the CPU 0503 determines whether the specified reading size received in step S2201 is a standard size that cannot be detected by the automatic document feeding device of the scanner 0512. If the CPU 0503 determines that the specified reading size is a standard size that cannot be detected (YES in step S2205), the processing proceeds to step S2206. If the CPU 0503 determines that the specified reading size is not a standard size that cannot be detected (NO in step S2205), the processing illustrated in the flowchart in FIG. 18 ends.

In step S2206, the CPU 0503 displays the document placement method description screen illustrated in FIG. 16 on the operation unit 0513.

As described above, in the case where a document is placed on the automatic document feeding device, depending on the specifying of a reading size based on the document detection capability of the automatic document feeding device, a screen for a document placement method is displayed, whereby it is possible to prevent the generation of a resulting product unintended by the user.

Steps S2203 and S2204 are not necessarily required. If the CPU 0503 determines in step S2202 that a document is placed on the automatic document feeding device, the processing may proceed to step S2205.

In the eighth exemplary embodiment, the description has been given of the method for, based on the document detection capability of the automatic document feeding device and whether a document is placed on the automatic document feeding device, displaying a document placement method.

In a case where the user specifies a reading size, a size specified as the reading size and a document size do not necessarily match each other. In a case where only a part of a document is read, the document size may be larger than the reading size. For example, a case is possible where only an upper portion of a document in the LTR size in the portrait orientation is needed, and thus, the STMT size in the landscape orientation is specified in the specifying of the reading size.

In a ninth exemplary embodiment, a description is given of a method for, further in a case where a document is placed on the automatic document feeding device, receiving a detected size based on the document size detection sensors 0603, 0613, and 0614 and displaying a document placement method.

Figure 19:
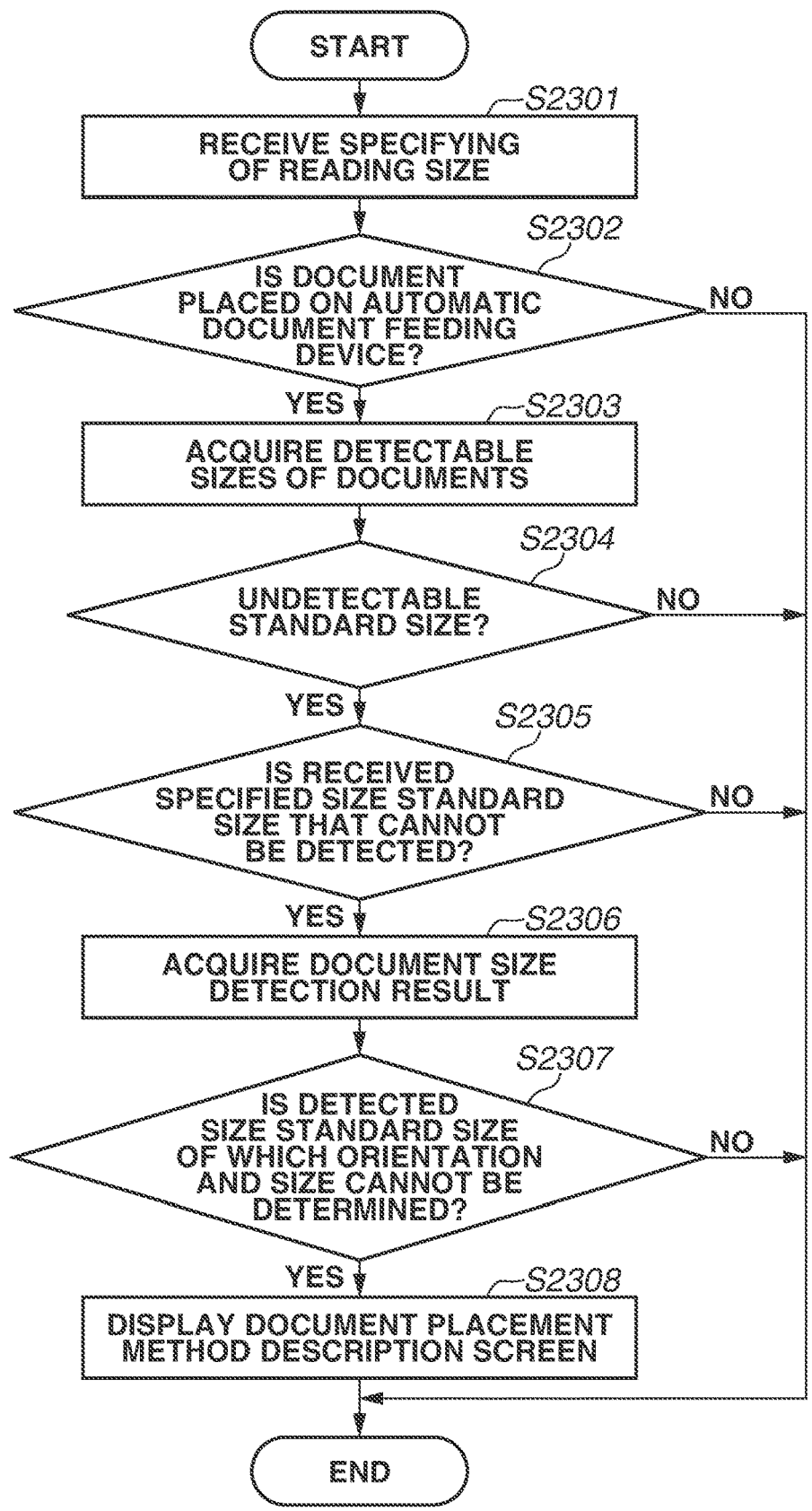
FIG. 19 is a flowchart illustrating a document placement method description screen according to an exemplary embodiment.
Figure 20:
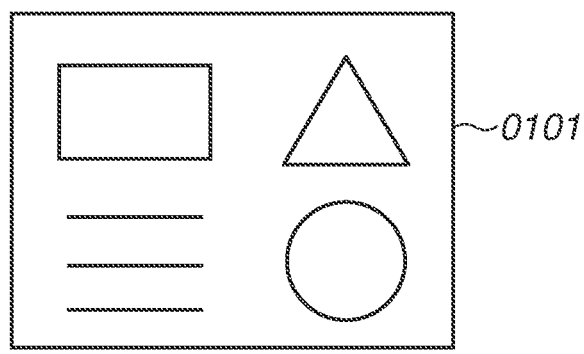
FIG. 20 is a diagram illustrating an example of a document in a ledger (LDR) size (11×17 inches).
Figure 22:
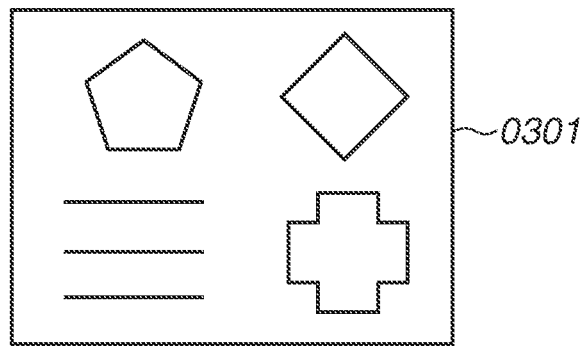
FIG. 22 is a diagram illustrating an example of a document in a statement (STMT) size (5.5×8.5 inches).

Next, with reference to a flowchart in FIG. 19, a description is given of a method for, based on sizes that can be detected by the automatic document feeding device, whether a document is placed on the automatic document feeding device, and a size detected by the document size detection sensors 0603, 0613, and 0614, displaying a document placement method. Steps illustrated in the flowchart in FIG. 19 are implemented by the CPU 0503 loading a program stored in the ROM 0505 into the RAM 0504 and executing the program.

In step S2301, the CPU 0503 confirms that a reading size specifying button for displaying a screen for setting a reading size is pressed on the operation unit 0513.

In step S2302, based on the presence or absence of a signal from the document sensor 0602, the CPU 0503 determines whether a document is placed on the automatic document feeding device. If the CPU 0503 receives from the document sensor 0602 a signal indicating that a document is set, the CPU 0503 determines that a document is placed on the automatic document feeding device (YES in step S2302), and the processing proceeds to step S2203. If the CPU 0503 does not receive from the document sensor 0602 the signal indicating that a document is set, the CPU 0503 determines that a document is not placed on the automatic document feeding device (NO in step S2302), and the processing illustrated in the flowchart in FIG. 19 ends. Instead of determining whether a document is not placed on the automatic document feeding device, if the document detection sensor for detecting a document placed on the document platen determines that a document is placed on the document platen, the processing illustrated in the flowchart in FIG. 19 may end.

In step S2303, the CPU 0503 acquires sizes of documents detectable by the automatic document feeding device of the scanner 0512.

In step S2304, based on the detectable sizes of documents acquired in step S2303, the CPU 0503 determines whether there is a standard size of which the orientation cannot be detected. In a case where the detectable sizes of documents are as illustrated in the table 1, the STMT size in the portrait orientation and the STMT size in the landscape orientation are different in the document size and the placement orientation, but obtain the same document size detection results, i.e., the STMT size in the landscape orientation. In other words, the image processing apparatus 0501 cannot detect the STMT size in the portrait orientation. This is because if a document in the STMT size in the portrait orientation is set, the document is detected as the document in the STMT size in the landscape orientation. In response, if there are sets of document sizes and placement orientations that are different in the document size and the placement orientation, but obtain the same document size detection results, the CPU 0503 determines that there is a standard size of which the orientation cannot be detected. On the other hand, if there are not sets of document sizes and placement orientations that are different in the document size and the placement orientation, but obtain the same document size detection results, the CPU 0503 determines that there is not a standard size of which the orientation cannot be detected. If the CPU 0503 determines that there is a standard size of which the orientation cannot be detected (YES in step S2304), the processing proceeds to step S2305. On the other hand, if the CPU 0503 determines that there is not a standard size of which the orientation cannot be detected (NO in step S2304), the processing illustrated in the flowchart in FIG. 19 ends. Then, the CPU 0503 instructs the scanner 0512 to convey the document and controls the scanner 0512 to read an image in the reading size received and stored in the RAM 0504 in step S2301.

In step S2305, the CPU 0503 determines whether the specified reading size received in step S2301 is a standard size that cannot be detected by the automatic document feeding device of the scanner 0512. If the CPU 0503 determines that the specified reading size is a standard size that cannot be detected (YES in step S2305), the processing proceeds to step S2306. If the CPU 0503 determines that the specified reading size is not a standard size that cannot be detected (NO in step S2305), the processing illustrated in the flowchart in FIG. 19 ends.

In step S2306, the CPU 0503 acquires a document size detection result of the automatic document feeding device of the scanner 0512.

In step S2307, based on the document size detection result acquired in step S2306, the CPU 0503 determines whether the detected document size is a standard size of which the orientation or the size cannot be correctly determined. If the CPU 0503 determines that the detected document size is a standard size of which the orientation or the size cannot be correctly determined (YES in step S2307), the processing proceeds to step S2308. On the other hand, if the CPU 0503 determines that the detected document size is not a standard size of which the orientation or the size cannot be correctly determined (NO in step S2307), the processing illustrated in the flowchart in FIG. 19 ends.

In step S2308, the CPU 0503 displays a document placement method description screen on the operation unit 0513.

As described above, in a case where a document is placed on the automatic document feeding device, a document size detection result of the automatic document feeding device is used. Consequently, depending on the specifying of a reading size based on the document detection capability of the automatic document feeding device, a screen for a document placement method is displayed, whereby it is possible to prevent the generation of a resulting product unintended by the user.

Steps S2303 and S2304 are not necessarily required. If the CPU 0503 determines in step S2302 that a document is placed on the automatic document feeding device, the processing may proceed to step S2305.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-109842, filed Jun. 25, 2020, which is hereby incorporated by reference herein in its entirety.

What is claimed is:

1. An image processing apparatus comprising:
a conveyance unit configured to convey a document set on a document tray;
a document detection sensor provided on the document tray;
a determining unit configured to determine, based on a signal from the document detection sensor, a size of the document and an orientation of the document;
a reading unit configured to read the document conveyed by the conveyance unit;
a selection unit configured to select, from among candidates of sets of sizes and orientations of a plurality of documents that can be conveyed by the conveyance unit, a set of a reading size and a reading orientation of the document;
a determination unit configured to determine whether there is a set of a size and an orientation of a document of which the orientation cannot be correctly determined by the determining unit among the sets of the sizes and the orientations of the plurality of documents that can be conveyed by the conveyance unit; and
a control unit configured to set candidates to be selected by the selection unit,
wherein, in a case where the determination unit determines that there is not a set of a size and an orientation of a document of which the orientation cannot be correctly determined by the determining unit, the control unit sets, as candidates to be selected by the selection unit, the candidates of the sets of the sizes and the orientations of the plurality of documents, and
wherein, in a case where the determination unit determines that there is a set of a size and an orientation of a document of which the orientation cannot be correctly determined by the determining unit, the control unit sets, as candidates to be selected by the selection unit, candidates obtained by excluding the set of the size and the orientation of the document of which the orientation cannot be correctly determined by the determining unit from the candidates of the sets of the sizes and the orientations of the plurality of documents.

2. The image processing apparatus according to claim 1, further comprising a judgement unit configured to judge whether a document is present on the document tray,
   wherein, even in the case where the determination unit determines that there is not a set of a size and an orientation of a document of which the orientation cannot be correctly determined by the determining unit, but in a case where the judgement unit judges that a document is not present on the document tray, the control unit sets, as candidates to be selected by the selection unit, the candidates of the sets of the sizes and the orientations of the plurality of documents.

3. The image processing apparatus according to claim 1, wherein the set of the size and the orientation of the document of which the orientation cannot be correctly determined by the determining unit is a set of a statement (STMT) size and a portrait orientation.

4. The image processing apparatus according to claim 1, further comprising a display unit configured to display a plurality of objects corresponding to the sets of the sizes and the orientations of the plurality of documents that can be conveyed by the conveyance unit,
   wherein the selection unit selects the reading size of the document by receiving, from a user, selection of a single object from among the plurality of objects displayed by the display unit.

5. The image processing apparatus according to claim 4, wherein the display unit displays, among the plurality of objects corresponding to the sets of the sizes and the orientations of the plurality of documents that can be conveyed by the conveyance unit, an object corresponding to the set of the size and the orientation of the document excluded from the candidates so that the displayed object cannot be selected by the user.

6. An image processing apparatus comprising:
   a conveyance unit configured to convey a document set on a document tray;
   a document detection sensor provided on the document tray;
   a determining unit configured to determine, based on a signal from the document detection sensor, a size of the document and an orientation of the document;
   a reading unit configured to read the document conveyed by the conveyance unit;
   a selection unit configured to select, from among candidates of sets of sizes and orientations of a plurality of documents that can be conveyed by the conveyance unit, a set of a reading size and a reading orientation of the document;
   a determination unit configured to determine whether the size of the document determined by the determining unit is a size of a document of which an orientation cannot be correctly determined; and
   a control unit configured to set candidates to be selected by the selection unit,
   wherein, in a case where the determination unit determines that the size determined by the determining unit is not the size of the document of which the orientation cannot be correctly determined, the control unit sets, as candidates to be selected by the selection unit, the candidates of the sets of the sizes and the orientations of the plurality of documents, and
   wherein, in a case where the determination unit determines that the size determined by the determining unit is the size of the document of which the orientation cannot be correctly determined, the control unit sets, as candidates to be selected by the selection unit, candidates obtained by excluding the set of the size and the orientation of the document of which the orientation cannot be correctly determined by the determining unit from the candidates of the sets of the sizes and the orientations of the plurality of documents.

7. An image processing apparatus comprising:
   a conveyance unit configured to convey a document set on a document tray;
   a document detection sensor provided on the document tray;
   a determining unit configured to determine, based on a signal from the document detection sensor, a size of the document and an orientation of the document;
   a reading unit configured to read the document conveyed by the conveyance unit;
   a selection unit configured to select, from among candidates of sets of sizes and orientations of a plurality of documents that can be conveyed by the conveyance unit, a set of a reading size and a reading orientation of the document;
   a determination unit configured to determine whether a set of the reading size and the reading orientation of the document selected by the selection unit is a set of a reading size and a reading orientation of a document of which the orientation cannot be correctly determined by the determining unit; and
   a display unit configured to display a screen,
   wherein, in a case where the determination unit determines that the set of the reading size and the reading orientation of the document selected by the selection unit is the set of the reading size and the reading orientation of the document of which the orientation cannot be correctly determined by the determining unit, the display unit displays a screen for a user to select the reading orientation of the document separately from the reading size of the document.

8. The image processing apparatus according to claim 7, further comprising a judgement unit configured to judge whether a document is present on the document tray,
   wherein, even in a case where the determination unit determines that the reading size of the document selected by the selection unit is the set of the size and the orientation of the document of which the orientation cannot be correctly determined by the determining unit, but in a case where the judgement unit judges that a document is not present on the document tray, the display unit does not display the screen for the user to select the reading orientation of the document separately from the reading size of the document.

9. An image processing apparatus comprising:
   a conveyance unit configured to convey a document set on a document tray;
   a document detection sensor provided on the document tray;
   a determining unit configured to determine, based on a signal from the document detection sensor, a size of the document and an orientation of the document;
   a reading unit configured to read the document conveyed by the conveyance unit;
   a selection unit configured to select, from among candidates of sets of sizes and orientations of a plurality of documents that can be conveyed by the conveyance unit, a set of a reading size and a reading orientation of the document;

a determination unit configured to determine whether a set of the reading size and the reading orientation of the document selected by the selection unit is a set of a reading size and a reading orientation of a document of which the orientation cannot be correctly determined by the determining unit; and a notification unit configured to notify a user, wherein, in a case where the determination unit determines that the set of the reading size and the reading orientation of the document selected by the selection unit is the set of the reading size and the reading orientation of the document of which the orientation cannot be correctly determined by the determining unit, the notification unit notifies that the user should place the document in an orientation in which the orientation of the document can be correctly determined by the determining unit.

10. The image processing apparatus according to claim 9, further comprising a judgement unit configured to judge whether a document is present on the document tray, wherein, even in a case where the determination unit determines that the set of the reading size and the reading orientation of the document selected by the selection unit is the set of the reading size and the reading orientation of the document of which the orientation cannot be correctly determined by the determining unit, but in a case where the judgement unit judges that a document is not present on the document tray by the judgement unit, the notification unit does not notify the user that the user should place the document in the orientation in which the orientation of the document can be correctly determined by the determining unit.

11. A control method for controlling an image processing apparatus having a conveyance unit configured to convey a document set on a document tray, a document detection sensor provided on the document tray, a determining unit configured to determine, based on a signal from the document detection sensor, a size of the document and an orientation of the document, and a reading unit configured to read the document conveyed by the conveyance unit, the control method comprising:

selecting, from among candidates of sets of sizes and orientations of a plurality of documents that can be conveyed by the conveyance unit, a set of a reading size and a reading orientation of the document;

determining whether there is a set of a size and an orientation of a document of which the orientation cannot be correctly determined by the determining unit among the sets of the sizes and the orientations of the plurality of documents that can be conveyed by the conveyance unit; and setting candidates to be selected, wherein, in a case where it is determined that there is not a set of a size and an orientation of a document of which the orientation cannot be correctly determined by the determining unit, setting includes setting, as candidates to be selected, the candidates of the sets of the sizes and the orientations of the plurality of documents, and wherein, in a case where it is determined that there is a set of a size and an orientation of a document of which the orientation cannot be correctly determined by the determining unit, setting includes setting, as candidates to be selected, candidates obtained by excluding the set of the size and the orientation of the document of which the orientation cannot be correctly determined by the determining unit from the candidates of the sets of the sizes and the orientations of the plurality of documents.

* * * * *